US006493396B1

(12) United States Patent
Nguyen et al.

(10) Patent No.: US 6,493,396 B1
(45) Date of Patent: Dec. 10, 2002

(54) PHASE SHIFT KEY BURST RECEIVER HAVING IMPROVED PHASE RESOLUTION AND TIMING AND DATA RECOVERY

(75) Inventors: Luu V. Nguyen, Naperville, IL (US); Victor S. Ivashin, Rohnert Park, CA (US)

(73) Assignees: Tellabs Operations, Inc, Naperville, IL (US); Advanced Fibre Communications, Naperville, IL (US)

( * ) Notice: Subject to any disclaimer, the term of this patent is extended or adjusted under 35 U.S.C. 154(b) by 0 days.

(21) Appl. No.: 09/228,354

(22) Filed: Jan. 11, 1999

(51) Int. Cl.[7] .......................... H04L 27/10; H04L 27/18
(52) U.S. Cl. ................... 375/279; 375/316; 375/322; 375/326
(58) Field of Search ....................... 375/279, 316, 375/322, 326, 329, 354, 360, 371

(56) References Cited

U.S. PATENT DOCUMENTS

| 4,234,957 A |   | 11/1980 | Tracey et al. ............ 375/86 |
| 4,559,499 A | * | 12/1985 | Bursztejn et al. .......... 329/50 |
| 4,682,343 A | * | 7/1987 | Pfiffner .................. 375/59 |
| 4,856,027 A |   | 8/1989 | Nakamura et al. ......... 375/81 |
| 5,202,901 A | * | 4/1993 | Chennakeshu et al. ..... 375/84 |
| 5,282,227 A | * | 1/1994 | Crawford ................. 375/81 |
| 5,490,176 A |   | 2/1996 | Peltier .................. 375/325 |
| 5,491,713 A |   | 2/1996 | Kwok et al. ............. 375/333 |
| 5,745,530 A |   | 4/1998 | Baek et al. ............. 375/342 |

FOREIGN PATENT DOCUMENTS

| EP | 0 613 268 A2 | 8/1994 |
| EP | 0 757 449 A  | 2/1997 |
| WO | WO 93/01667  | 1/1993 |
| WO | WO 97 14241 A | 4/1997 |

OTHER PUBLICATIONS

Takenaka, et al., "A Digital Signal Processing Demodulator with a Wide Frequency Acquisition Range" *IEEE International Conference on Communications*, 15–19:1418–1422 (Apr. 19, 1990).

* cited by examiner

*Primary Examiner*—Mohammad H. Ghayour
(74) *Attorney, Agent, or Firm*—McAndrews, Held & Malloy, Ltd.

(57) ABSTRACT

A receiver includes an I-Q demodulator (135) responsive the I and Q components carried on a first frequency signal line (132). The demodulator comprises a demodulator frequency generator (275) for generating a demodulating signal to extract the carried I and Q components. A phase adjustment circuit (105), responsive to the I and Q components that are maintained at a predetermined relationship, makes the demodulating signal substantially in phase with the first frequency signal. A transition detector (445) generates a state transition signal in response to a change of state of at least one of the I and Q signals. A peak detector (460) generates a peak detected signal in response to occurrence of a peak amplitude of at least one of the I and Q signals. A clock generator (470) adjusts the phase of a symbol clock signal used to decode the I and Q components in response to the state transition signal and peak detected-signal.

61 Claims, 4 Drawing Sheets

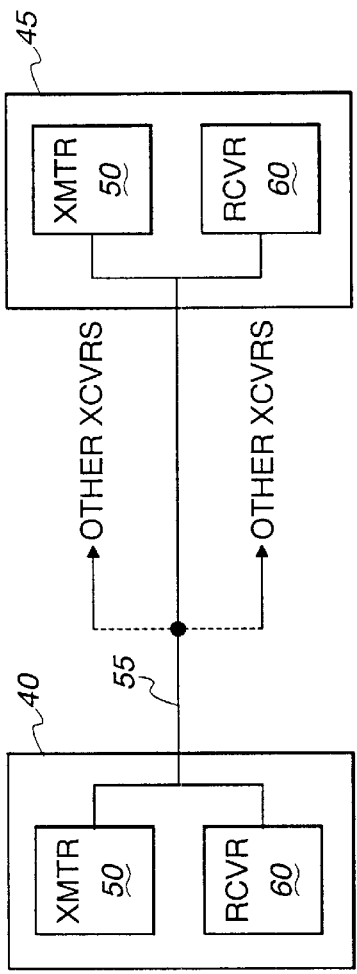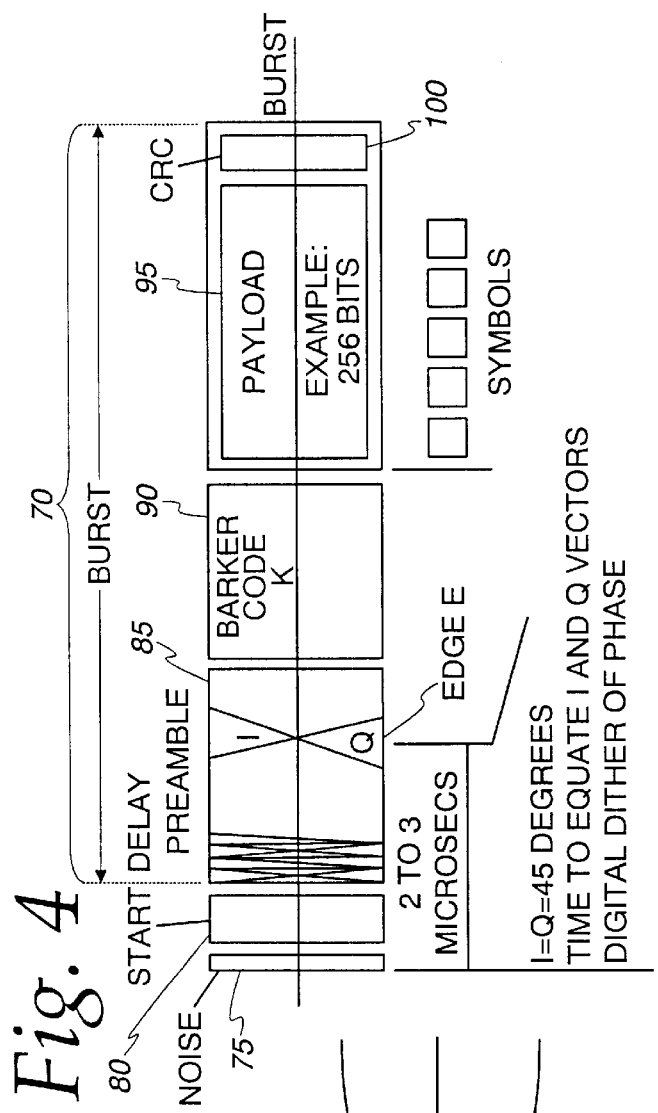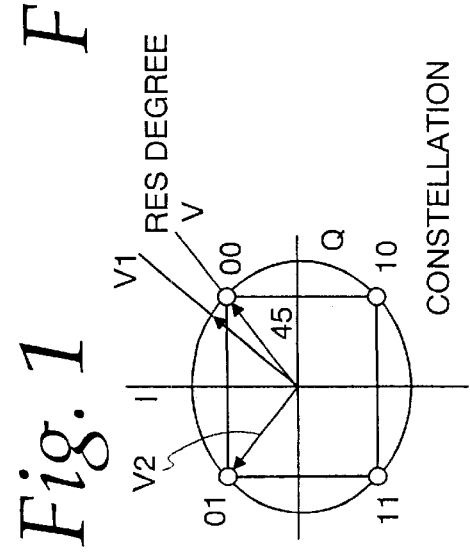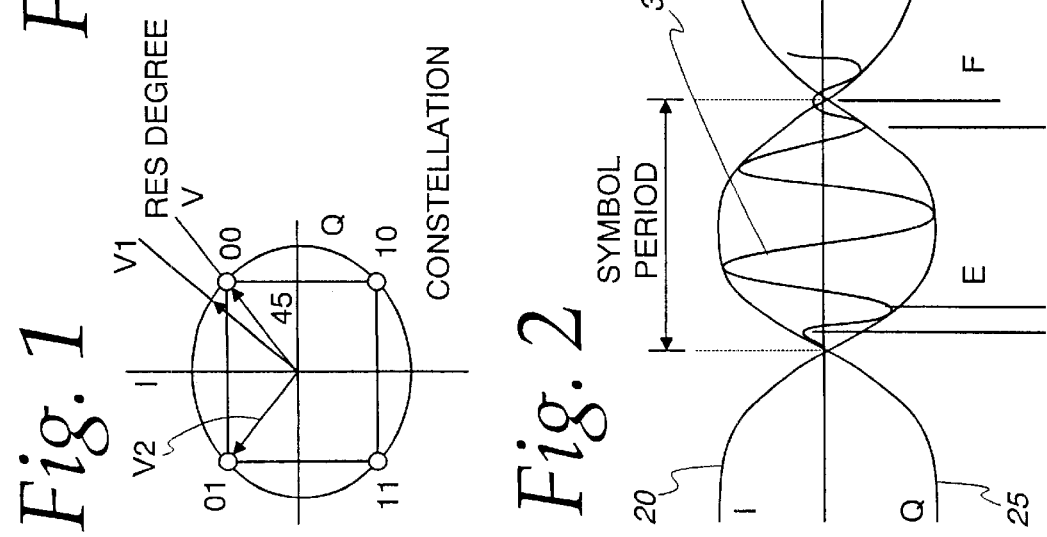

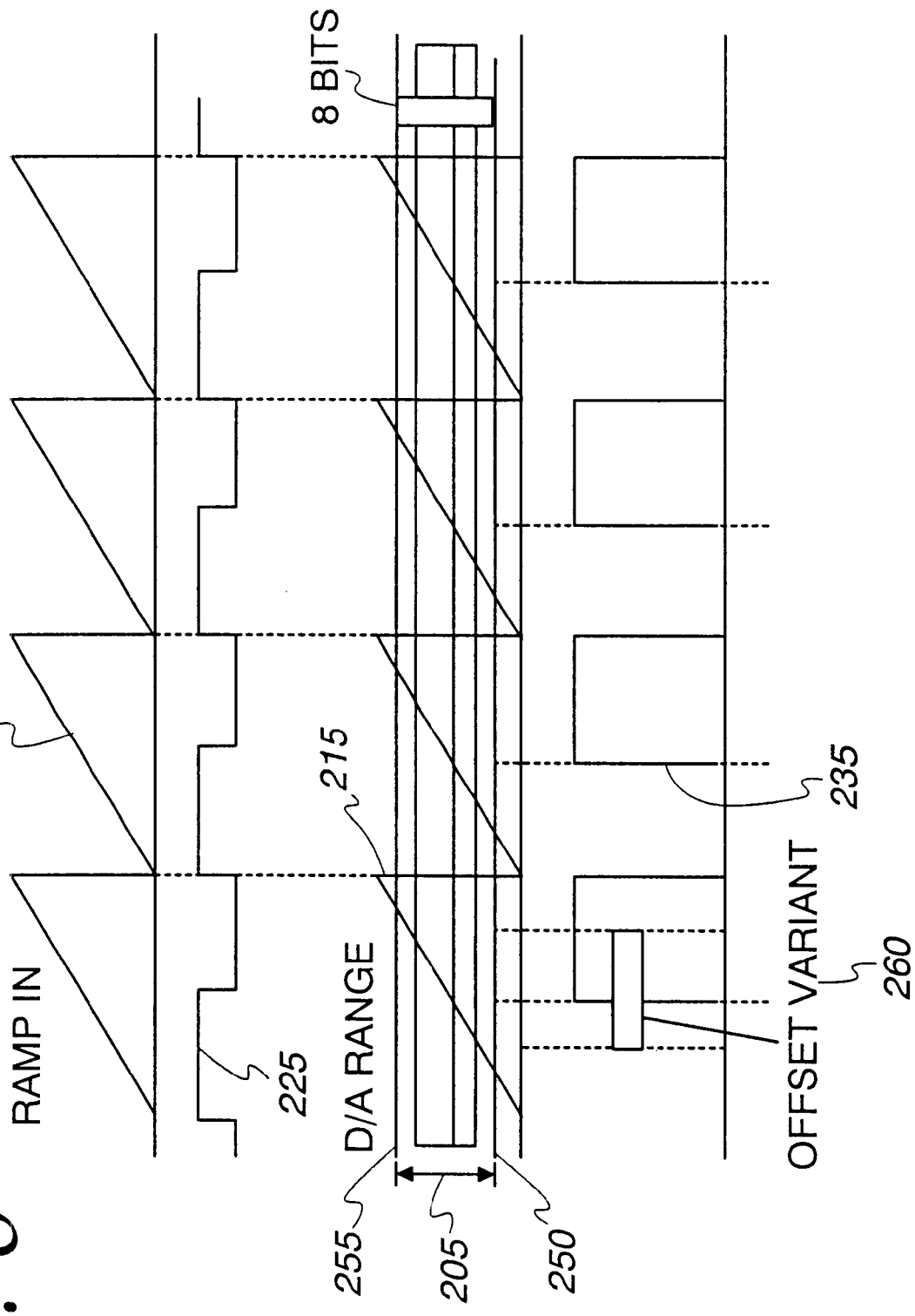

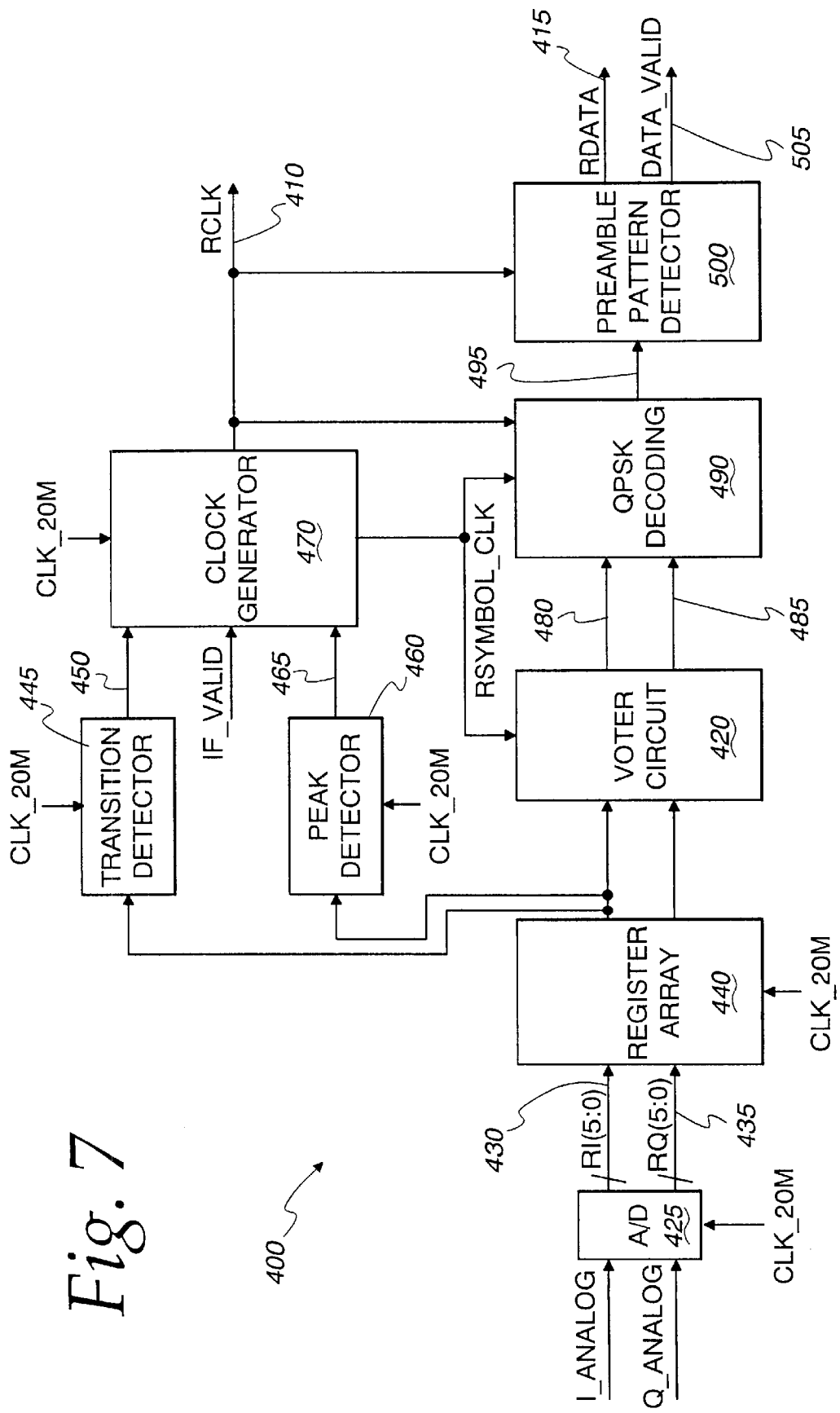

US 6,493,396 B1

PHASE SHIFT KEY BURST RECEIVER HAVING IMPROVED PHASE RESOLUTION AND TIMING AND DATA RECOVERY

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Communications systems using phase shift keying (PSK) modulation schemes are known. Such systems use the phase of a transmitted/received signal to transmit/receive intelligent data. The transmitted/received signal can be represented as a series of data vectors originating at the origin and having end points at data point values on a circle of an orthogonal system. Each data vector, accordingly, has an in phase component, known as the I coordinate or value of the data vector, and a quadrature component, known as the Q coordinate or value of the data vector. The transmissions from the transmitter of the communications system to a receiver of the communications system are often in the form of bursts of data, particularly in point-to-multipoint communications systems.

A PSK system in which data is represented by n points or vectors on the circle is known as an nPSK system. In nPSK systems there are "n" number of (usually equally spaced) data points along the vector circle, each point representing transmitted/received data. I and Q vectors change their relation with each other to control the data sent in nPSK systems. The relationship is referred to as a rotation of the composite phase vector V in an I and Q orthogonal system. This relationship is depicted in FIG. 1.

In QPSK (Quadrature Phase Shift Keying) systems, four data points are used. The I and Q vectors form "symbols" of information, each symbol being one of the four digital states represented by the I and Q vectors, taken as 2 bits and relating to the four points seen on the circle of FIG. 1 and labeled 00, 01, 10, 11. QPSK systems offer an advantage in that the data points are few in number. As such, any phase error in the QPSK receiver causing the vector V to improperly move from position V to V1 of FIG. 1 will have to be substantial before the receiver has difficulty resolving whether it is the data point representing, for example, data state 00 of vector V1 or the data point representing data state 01 of vector V2. This phase error is most often caused by slips and shifts in time of the I and Q at the beginning and ending edges of a symbol period. These slips and shifts are frequently a function of phase errors between the received signal after it has been down converted to an intermediate frequency, IF, and the IF signal used to demodulate the QPSK symbols.

Referring to FIG. 2, there is shown the I and Q signals represented by lines 20 and 25 of a received signal that has been down converted to an intermediate frequency. As shown, the I and Q signals change states in accordance with the data transmitted during each symbol period. As such, the received sinusoidal IF that was used to develop the I (line 20) and the Q (line 25) envelope depicted by line 30, unless it is absolutely phased to the signal used in the modulation of the I and Q signal, will have inaccuracies during the times designated at E and F. This inaccuracy in the envelope will cause phase errors. The higher the ratio between the IF frequency and the I and Q signal transition frequencies, the better the resolution and hence less phase error.

One manner of synthesizing the signal used to demodulate the I and Q signals is to synthesize the demodulating signal using direct digital synthesis (DDS) of the entire IF waveform, keeping the received IF signal and synthesized demodulating signal completely in phase at all times. The present inventors, however, have recognized that such DDS schemes are often quite complicated and costly to implement. As such, they have set forth an nPSK burst communications system and receiver architecture which is less costly to implement than its DDS counterpart while still being highly reliable and accurate. Additionally, the inventors have set forth a clock generator/data decoding circuit that improves the integrity of the received data.

BRIEF SUMMARY OF THE INVENTION

An nPSK communications system is set forth. The communications system includes a transmitter for transmitting phase shift key modulated burst signals, including I and Q components, on a transmission medium. The burst signals include a prefix portion and a data portion. The I and Q components of the prefix portion are maintained at a predetermined relationship during at least a portion of the prefix portion. The communications system also includes a receiver for receiving the phase shift key modulated burst signals from the transmission medium. The receiver includes an IF section for mixing received burst signals to an intermediate frequency signal, the intermediate frequency signal having a phase. The receiver further includes an I-Q demodulator that comprises a demodulator frequency generator for generating a demodulating signal having a frequency equal to or an integer multiple of the intermediate frequency signal to thereby extract the I and Q components of the received burst signals. A phase adjustment circuit, responsive to the I and Q components that are maintained at the predetermined relationship, is used for adjusting the phase of the demodulating signal so that it is substantially in phase with the intermediate frequency signal.

In accordance with a further aspect of the disclosed invention, a receiver for receiving phase shift key modulated signals that are transmitted at a symbol rate in which a circuit for determining the respective states of baseband I and Q signals of the phase shift key modulated signals is set forth. The circuit comprises a transition detector for detecting a state transition of at least one of the baseband I and Q signals and for generating a state transition signal in response to the state transition. A peak detector circuit detects the occurrence of the peak amplitude of at least one of the baseband I and Q signals and generates a peak detected signal in response to occurrence of the peak amplitude. A clock generator circuit generates the symbol clock signal at the symbol rate in response to the state transition signal and the peak detected signal to adjust the phase of the symbol clock signal. An analog-to-digital converter samples each of the baseband I and Q component signals at a predetermined rate to generate a first digital sample output stream from the baseband I component and a second digital sample output stream from the baseband Q component. Each digital data sample of the first digital sample output stream is indicative of a logic state of the baseband I component at a respective sample time and each digital data sample of the second digital sample output stream is indicative of a logic state of the baseband Q component at a respective sample time. The predetermined rate is at least twice the Nyquist frequency of the baseband I and Q component signals. A voter circuit receives the first and second digital data sample streams, and, in response to occurrence of the symbol clock signal, compares a current digital data sample of the first digital data sample output stream to prior and subsequent digital data samples of the first digital data sample output stream to provide an I state signal output and, in response to occurrence of the symbol clock signal, compares a current digital data sample of the second digital data sample output stream to prior and subsequent digital data samples of the second digital data sample output stream to provide a Q state signal output.

BRIEF DESCRIPTION OF THE SEVERAL VIEWS OF THE DRAWINGS

FIG. 1 is a graph of a QPSK data signal, including all available data states, in an I-Q orthogonal system.

FIG. 2 illustrates the I, Q, and intermediate frequency components of a plurality of symbols of a received PSK signal.

FIG. 3 is a block diagram of a communications system comprising a plurality of transceivers.

FIG. 4 illustrates one format for a PSK burst signal.

FIG. 6 is a timing diagram illustrating the relationship between various signals of the circuit of FIG. 5.

FIG. 7 is a schematic block diagram of one embodiment of a symbol timing and data recovery circuit that is constructed in accordance with a further aspect of the present invention.

DETAILED DESCRIPTION OF THE INVENTION

Figure 5:
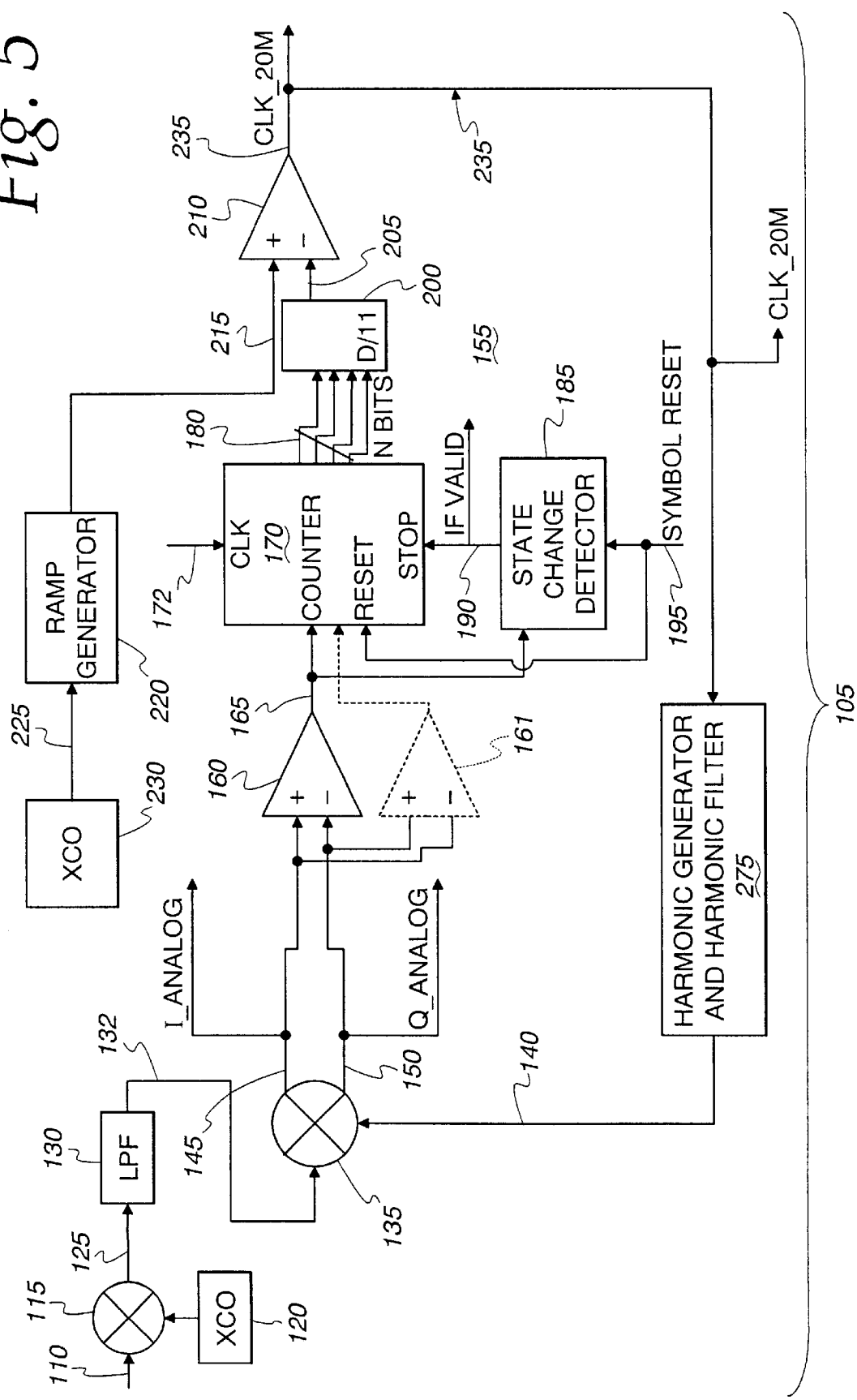
FIG. 5 is a schematic block diagram of one embodiment of a receiver demodulator circuit including a phase adjustment circuit that is constructed in accordance with the teachings of the present invention.

FIG. 3 is a schematic block diagram of a communications system employing two or more transceivers 40, 45. Each transceiver 40, 45 comprises a transmitter 50 for transmitting phase shift keyed modulated burst signals on a transmission medium 55, such as coaxial cable, air, etc. Each transceiver 40, 45 further includes a receiver 60 for receiving phase shift keyed modulated burst signals from the transmission medium 55. Although only two transceivers 40, 45 are illustrated in FIG. 3, it will be recognized that transceiver 40 may, for example, constitute a primary transceiver that communicates with a plurality of secondary transceivers disposed at a plurality of remote sites along transmission media 55. Such a system architecture would be used in a point-to-multipoint communications system.

FIG. 4 illustrates an exemplary embodiment of a burst frame 70 of I and Q information for a PSK signal suitable for use in the present system. As illustrated, a typical burst is often preceded by noise energy 75 and a start delay 80, which may include noise energy. A preamble 85 is transmitted that, as will be set forth in further detail below, allows the circuits of a receiver 60 of FIG. 3 to synchronize to the burst stream 70 and properly decode the transmitted data. During at least a portion of the preamble 85, the I and Q vectors sent in the burst are brought and maintained in a predetermined relationship. Preferably, they are held at the same phase, typically 45 degrees as depicted in FIG. 1. Once synchronization is obtained, a Barker Code 90 is transmitted for verifying the signal identity. The Barker Code 90 is followed by the payload data 95. An ending check series of data bits, identified here as the CRC field 100 permits error checking against all of the data of the transmitted burst frame 70.

FIG. 5 illustrates one embodiment of the components of a receiver 60 (from FIG. 3) that utilizes the predetermined phase relationship of the I and Q signals transmitted in the preamble 85 of the burst frame 70 for synchronization of the phase of a demodulating IF signal with the phase of the received burst signal at IF. For illustrative purposes, and without limitation, it is assumed that a signal supplied at the input at 110 of the receiver circuit of FIG. 5 is at a frequency of 70 megaHertz or has been down converted to a frequency of 70 megaHertz. Further, it is assumed that the receiver utilizes an intermediate frequency of 20.736 megaHertz at the demodulation stage. It is further assumed that the intermediate frequency of 20.736 megaHertz is eight times the data rate of 2.592 megaHertz and sixteen times the symbol rate of 1.296 megaHertz. Such values achieve a good sampling ratio of data to carrier, keeping phase errors small. Further, it is assumed that the communication systems uses QPSK modulation.

With respect to FIG. 5, framed bursts of QPSK signals are supplied to the receiver circuit 105 at input 110. The received signal is mixed at mixer 115 with a signal generated by, for example, a crystal oscillator 120 to down convert the received signal to an intermediate frequency. In the illustrated embodiment, the crystal oscillator 120 generates a mixing signal at 49.264 megaHertz to generate an output signal at line 125 at the intermediate frequency of 20.736 megaHertz, this being in this example 70 megaHertz minus 49.264 megaHertz. The received signal at the intermediate frequency is subsequently passed through a low pass filter 130 to filter out any harmonic images above the intermediate frequency which resulted from the mixing by 115.

The resulting signal is supplied along line 132 for mixing in a quadrature demodulator 135 with a demodulating IF signal supplied at line 140. The signal is mixed to baseband to provide the I component of the received signal at line 145 and the Q component of the received signal at line 150. In a preferred embodiment, although without limitation, such demodulating to baseband may be executed in, for example, a quadrature demodulator such as an RF2701 IC available from RF Micro-Devices of Greensboro, N.C. If such an integrated circuit is used, the demodulating IF signal at line 140 is at a frequency that is twice the received signal IF frequency at line 132. However, it will be recognized that various other mixers/quadrature demodulators may require a demodulating IF signal having a frequency equal to the frequency of the received signal IF, or at another multiple thereof.

In order to reduce or eliminate the phase errors during the times illustrated at E and F of FIG. 2, the phase of the demodulating IF signal at line 140 and the phase of the received IF signal at line 132 should be substantially equal to one another or be non-variant in time. To this end, the receiver circuit 105 is provided with a phase adjustment circuit that uses the predetermined phase relationship of the I and Q signals of the preamble 85 of the framed burst signal 70 to provide the necessary phase adjustment to the demodulating IF signal at line 140.

One embodiment of the phase adjustment circuit is illustrated generally at 105 in FIG. 5. As shown, the I and Q signal outputs of the quadrature demodulator 135 are supplied to the input of a comparator circuit 160. In the preferred format for the framed burst, the magnitude of the I and Q signals of the preamble 85 are equal. Even more preferably, the I and Q signals of the preamble 85 are equal in magnitude when the IQ vector of FIG. 1 is at 45 degrees and the desired burst demodulation technique will so maintain the resulting vector at an angle of 45 degrees (e.g., at data point 00 of FIG. 1). As such, the output at line 165 of the comparator circuit 160 will be at a zero when the phase of the demodulating IF signal at 140 is equal to the phase of the received IF signal at 132. In instances in which the phases of the IF signals differ from one another, the output 165 of comparator circuit 160 is non-zero. Other similar comparators 161 can be used to determine in which quadrant of FIG. 1 the IQ vector lies.

The output of comparator circuit 160 is supplied as an actuating input to a counter 170, such as an 8-bit counter. The source of the clocking signal 172 for the counter 170 may come from a local source such as the crystal oscillator's clocking signal 225 or from yet another faster source. This will affect the time of acquisition. A non-zero output from comparator circuit 160 causes the counter 170 to execute its counting cycle thereby generating sequential digital binary signals at the counter output 180. The count sequence may be progressive; starting from a minimum to a maximum, it may be pseudo-random or it may be intelligently driven by a state machine that examines the output of comparator 160 (or other such comparators 161) and changes the count dependent on the sample. A state change detector 185 is connected to receive the signal output of comparator circuit 160 and generates a counter stop signal at line 190 when the output 165 of comparator circuit 160 transitions from a non-zero state to a zero state, indicating equality of I and Q signals. Thus, the counting cycle ends when a change in state of the comparator output signal is detected. The counter stop signal at line 190 may also be used to signal other circuits of receiver 60 that the synchronization between the received and demodulating IF signals has been achieved. In this example, the term "IF_Valid" is used as such a signal. Before the receipt of the preamble of a framed burst, a reset signal is provided at line 195 to the state change detector 185 and to reset the counter 170 for the next framed burst.

The counter output of n binary bits 180 is supplied to the input of a digital-to-analog converter 200 that converts the sequential, multibit digital binary signals to an analog signal at line 205 that is supplied to the input of a further comparator 210. The signal at line 205 is compared by comparator 210 with a ramping signal that is supplied on line 215. The ramping signal is generated by a ramp generator 220 from an unphased clocking signal that is supplied at line 225 by an oscillator 230, such as a crystal oscillator. The unphased clocking signal is at the same frequency as the received IF signal at line 132 to thereby generate the ramping signal at line 215 of the same frequency (e.g., 20.736 megaHertz). The output of the comparator 210 is a periodic pulse that has its phase principally dependent on the digital data output of counter 200.

Referring to FIG. 6, the relationships between the ramping signal 215, the clocking signal 225, the output of the analog-to-digital converter 205, and the output 235 of comparator 210 are illustrated. As shown, the ramping signal 215 is in phase with the clocking signal 225. The amplitude of the ramping signal 215 extends through the lower value 250 and the upper value 255 output of the digital-to-analog converter 200. This relationship generates a periodic pulse 235 at the output of comparator 210 that is at the same frequency as the clocking signal 225 but in which the starting phase of the signal at the output of the comparator 210 is variable with respect to the clocking signal 225 over a predetermined phase range 260. Preferably, the phase of the pulse signal at the output of the comparator 210 is adjustable with respect to the clocking signal 225 over a phase range of 180 degrees.

In the embodiment of the phase adjustment circuit illustrated in FIG. 5, the output of comparator 210 is supplied to the input of a harmonic generator and harmonic filter circuit 275. Within the harmonic generator/filter 275, the pulse output of comparator 210 is divided down, such as through a flip-flop or the like, to generate a symmetrical 50 percent duty cycle waveform that is, for example, at ½ the frequency of the comparator output signal (e.g., 10.368 megaHertz). The harmonic generator portion of circuit 275 expands the spectral content of the divided down signal while the filter portion of circuit 275 utilizes a selective filter technique to extract the desired demodulating IF signal that is supplied to the quadrature demodulator 135 at line 140. Available in the harmonic generator are the input frequency, one-half the input, four times the input and so on. As noted above, a demodulating IF signal at 140 having a frequency at 41.472 megaHertz that is twice that of the received IF signal of 20.736 megaHertz is used in the illustrated embodiment. It will be recognized that other circuits may be used to generate a sinusoidal signal at line 140 from the periodic pulses that are output from comparator 210.

It is important to note that the phase of the signal at line 140 is adjusted by threshold voltage set at 200 and placed against 210. In operation, the receiver 60 receives the framed bursts 70 of QPSK signals from the transmitter 65. The phase relationship between the I and Q signals of the preamble 85 is detected by comparator circuit 160 that generates a zero output if the phase difference between the modulating IF signal and the received IF signal are equal, and a non-zero output if the phases are not equal. A non-zero output from comparator circuit 160 initiates a prescribed and guided counting sequence of counter 170 that effectively and dynamically adjusts the phase of the demodulating IF signal at line 140 until the output of comparator circuit 160 goes to a zero output signaling a 45 degree constellation at which time further counting ceases. The adjusting interval is during the preamble 85 of burst 70. It is during this time that edge E (see FIG. 4) occurs which signals that the adjustment phase is over, this being the state change 185. The adjusting interval is also named as the "phase dithering" interval. When such a transition occurs, the phase of the demodulating IF signal is substantially equal to the phase of the received IF signal thereby substantially reducing or eliminating phase errors in the detected I and Q signals.

Each receiver 60 is also provided with circuitry used to extract a data clock from the received QPSK signal and use that data clock to clock decoded QPSK data to make the data available to subsequent devices. FIG. 7 illustrates one embodiment of a data and data clock extraction circuit, shown generally at 400, that is suitable for such use. The data and data clock extraction circuit 400 of the illustrated embodiment digitally samples the I and Q components of each symbol, either continuously at a clocked rate or at predetermined intervals in which the samples are obtained at the clocked rate, and uses the samples to generate a data clock at line 410 and output data at line 415. To this end, the digital samples corresponding to one or both of the I and Q signals are monitored to determine the time of occurrence of a transition of the monitored signal and/or the time of occurrence of the peak magnitude of the transmitted signal. The time(s) of such occurrences are used to determine the proper phase for the data clock. Additionally, as will be set forth below, a voter circuit 420 is used to monitor the signs of each of the sampled I and Q values to ensure the integrity of the data at line 415.

As shown in FIG. 7, the I and Q analog signals that are available at the outputs of the quadrature demodulator 135 (of FIG. 5) are each applied to the respective input of an analog-to-digital converter 425. The analog-to-digital converter 425 samples each of the I and Q signals at a sampling rate that is preferably 16 times the symbol rate. In the illustrated embodiment, the a analog-to-digital converter 425 samples each of the I and Q signals using a sampling clock of 20.736 megaHertz, preferably the synchronized clock signal 235 of FIG. 5 available at the output of comparator 210 (of FIG. 5). The analog-to-digital converter 425 provides a first digital value at lines 430 corresponding to the amplitude and sign of the I signal and a second digital value at lines 435 corresponding to the amplitude and sign of the Q signal. In the illustrated embodiment, the I signal value is represented by a six bit value RI(5:0) comprised of an amplitude or magnitude value RI(4:0) and a sign bit RI(5). Similarly, the Q signal value is represented by a six bit value RQ(5:0) comprised of an amplitude value RQ(4:0) and a sign bit RQ(5). It is recognized that more or less bits may be used.

The digital data values corresponding to the I and Q signals are stored in a register array 440 or other memory. In the illustrated embodiment, eighteen digital data sample values are stored for each of the I and Q components transmitted in a single symbol transmission. Preferably, the values are stored and shifted through eighteen bit shift registers. The sign bits of either the I or Q sampled signals, RI(5) or RQ(5), are supplied to the input of a transition detector 445 to determine the time of occurrence of a transition in the particular signal being monitored, either I or Q. When the transition detector 445 detects a transition of the monitored signal, a sync pulse is generated at line 450. Preferably, a state machine is used to detect a zero crossing transition by searching for a transition pattern in five consecutive samples. In the embodiment of FIG. 7, a sync pulse is generated by a state machine if a pattern of "00111" or "11000" is detected. This pattern may be set through compare codes that are compared against the contents of the shift register having the sign bits.

In this example, the amplitude bits of the sampled I and Q signal, RI(4:0) and RQ(4:0), are applied to the input of a peak detector circuit 460. The amplitude bits are preferably shifted through eighteen bit shift registers. It is recognized that more registers may be used. These registers are used to detect the time of occurrence of the maximum peak amplitude of one or both of the I and Q signal samples over the entire baseband signal (16 times over-sampling per symbol plus two extra overlap samples). The peak detector circuit 460 is preferably a state machine that compares the magnitude of each sample. A sync pulse is generated by the state machine at line 465 to mark the time of occurrence of the maximum peak value.

The sync pulses from the peak detector 460 and the transition detector 445 are supplied to the input of a clock generator circuit 470. The clock generator circuit 470 preferably includes a counter or a state machine that is progressively advanced by the phased clock signal CLK_20 (e.g., 20.736 MHz) to generate the data clock RCLK (e.g., 2.592 MHz) and symbol clock RSYMBOL_CLK (e.g., 1.296 MHz) signals based on the timing of the sync pulses received from the peak detector 460 and transition detector 445. The symbol clock RSYMBOL_CLK is adjusted based on every sync pulse received from the transition detector 445. No adjustment to the symbol clock RSYMBOL_CLK is made if a transition was not detected. The sync pulse from the transition detector 445 is used, for example, to start a state machine or counter in the clock generator circuit 470. Similarly, the sync pulse from the peak detector 460 is used, for example, to start a state machine or counter in the clock generator circuit 470. The phase difference of both sync pulses (Transition and Maximum Peak) is used to generate a final sync pulse which is based on the average phase of both sync pulses. Ideally, the symbol clock pulse that is generated by the clock generator 470 is located at the center of the symbol. If, however, the phase difference between the sync pulses is greater than a predetermined value, for example, five sampling points, then the last symbol clock and data clock timing are held and no clock adjustment is made for that particular symbol. In the illustrated embodiment, the foregoing operations only occur, when the IF_Valid signal of FIG. 5 from the state change indicator indicates that phase correction has been completed.

As set forth in the embodiment of FIG. 7, the time of occurrence of both the peak amplitude and the transition of the monitored I or Q signal are used to determine the proper phase for the data clock and symbol clock. However, it will be recognized from the teachings set forth herein that either the peak or transition detections may be used alone to the exclusion of the other to generate the data and symbol clocks.

To reduce sampling error and enhance the performance of the receiver 60, a voter circuit 420 is used. The voter circuit 420 is used to determine the polarity of the sign bit for each of the I and Q components of the received signal based on an average of a predetermined number of sampling points. In the illustrated embodiment, the sign bits of five sampled points are used for each of the I and Q components. The sign bit for one sampling point is located at the center of the symbol as determined by the receipt of an RSYMBOL_CLK pulse, and the sign bits for the remaining four sampling points are located on either side of the center sampling point, two precursor and two post cursor. As such, the voter circuit 420 preferably check for pre-time and post-time drift away from the predicted center of the symbol.

In the particular embodiment set froth herein, the RSYMBOL_CLK is used to sample the five sign bits, each decoded from a counter. Compare logic is used for each sampling point to determine the point of sign bit change. The dominant polarity of the five sample points is selected to provide the final logic for the data recovery time sample. As such, if the five sampled points for the I signal are, for example, logic 00011, the voter circuit 420 will provide a logic 0 at output line 480. If the five sampled points for the I signal are, for example, logic 11100, the voter circuit 420 will provide a logic 1 at output line 480. The same comparison and output logic are provided for the Q signal and provided on output line 485 of the voter circuit 420.

The I and Q symbol values at output lines 480 and 485 of the voter circuit 420 are provided to the input of a QPSK decoder circuit 490. The QPSK decoder circuit 490 analyzes the last and present I and Q outputs from the voter circuit 420 and reconstructs the initial data bit pair. This pair is passed on to a parallel to serial converter in the decoder 490 where the received data stream is reconstructed. The QPSK decoder logic operates in accordance with the following Boolean expressions:

A=/(Ind xor Qnd)(Ind xor Q[n−1]d)+(Ind xor Qnd)(Qnd xor Q[n−1]d)

B=/(Ind xor Qnd)(Qnd xor Q[n−1]d)+(Ind xor Qnd)(Ind xor I[n−1]d)

Where (An, Bn) represents the decoded serial output sequence that is provided at line 495 corresponding to the decoded symbol, and (Ind, Qnd) and (I[n−1]d, Q[n−1]d) represent the present and previous inputs from the voter circuit 420.

The data at output line 495 may optionally be provided to the input of a preamble pattern detector 500. The preamble pattern detector 500 is used to verify the accuracy of the data recovery of the burst receiver. This circuit also generates a DATA_VALID signal which provides a flag bit to indicate a strong probability of correct data integrity and format timing. In the present embodiment, thirty preamble bits are transmitted as part of the preamble of formatted data frame 70 of FIG. 2. In this example, thirty preamble bits are transmitted in BPSK (Binary Phase Shift Keying) whereas the rest of the burst is in QPSK. The preamble bits provide the data transition required for the carrier and symbol timing recovery. A 7 bit Barker Code is also used for the detection of a valid carrier recovery and symbol timing recovery process qualification. The thirty preamble bits are preferably equal to a preset constant ("H3FFFCCES" in the present system). The 7 bit Barker code is also preferably a constant ("1110010" in the present system). A state machine is used to search for the valid Barker code in the preamble. This state machine is started only when the preamble bits are correct. A 32 bit counter is used to terminate the search after 30 bits of preamble are evaluated without a match. The DATA_VALID signal is only active if the Barker code is matched.

A subsequent storage or processing circuit is advised that the data provided from the preamble pattern detector 500 is valid when the DATA_VALID signal at line 505 is active. The burst data is available at output line 415 of the preamble pattern detector 500 and the data clock RCLK is available at output line 410 of the clock generator circuit 470.

Preferably, the entire circuit of FIG. 7, excluding the analog-to-digital converter 425, is implemented in an FPGA integrated circuit that has been properly programmed. One such FPGA device suitable for such use is the EPF8452 Flex 8000 device available from Altera Corporation.

Numerous modifications may be made to the foregoing system without departing from the basic teachings thereof. Although the present invention has been described in substantial detail with reference to one or more specific embodiments, those of skill in the art will recognize that changes may be made thereto without departing from the scope and spirit of the invention as set forth in the appended claims.

What is claimed is:

1. A communications system comprising:
    a transmitter for transmitting phase shift key modulated burst signals including I and Q components on a transmission medium, the burst signals including a prefix portion and a data portion, I and Q components of the prefix portion being maintained at a predetermined relationship during at least a portion of the prefix portion; and
    a receiver for receiving the phase shift key modulated burst signals from the transmission medium, the receiver comprising
    an IF section for mixing received burst signals to an intermediate frequency signal, the intermediate frequency signal having a phase,
    an I-Q demodulator that includes a demodulator frequency generator for generating a demodulating signal having a frequency equal to or an integer multiple of the intermediate frequency signal to thereby extract the I and Q components of the received burst signals, the demodulating signal having a phase, and
    a phase adjustment circuit, responsive to the I and Q components that are maintained at the predetermined relationship, for adjusting the phase of the demodulating signal so that the demodulating signal is substantially in phase with the intermediate frequency signal.

2. A communications system as claimed in claim 1 wherein the I component and Q component of the prefix portion comprise the same amplitude.

3. A communications system as claimed in claim 1 wherein the I and Q components of the prefix portion form a vector at 45 degrees with respect to an I axis of an I-Q orthogonal system.

4. A communications system as claimed in claim 1 wherein the phase adjustment circuit comprises:
    at least one comparator connected to receive the I and Q components from the I-Q demodulator and generating an output signal at a first output state when the predetermined relationship between the I and Q components of the prefix portion is not detected and a second output state when the predetermined relationship between the I and Q components is detected;
    a counter circuit connected to receive the output signal of the comparator, the counter circuit being actuated by the first output state of the output signal of the at least one comparator to execute a counting cycle and presenting digital data corresponding to the counting cycle at the output thereof, the counter circuit further having a reset input for resetting the counter circuit;
    a state change detector connected to receive the output signal of the comparator, the state change detector generating a reset signal to the reset input of the counter circuit when the output signal of the comparator goes from the first state to the second state;
    a digital-to-analog converter for converting the output of the counter to an analog signal output;
    a ramp generator for providing a ramping output signal at the intermediate frequency;
    a further comparator for comparing the ramping output signal to the analog output signal to thereby generate a phased pulse output signal; and
    a harmonic circuit for generating the demodulating signal in response to the phased pulse output signal.

5. A communications system as claimed in claim 2 wherein the phase adjustment circuit comprises:
    at least one comparator connected to receive the I and Q components from the I-Q demodulator and generating an output signal at a first output state when the predetermined relationship between the I and Q components of the prefix portion is not detected and a second output state when the predetermined relationship between the I and Q components is detected;
    a counter circuit connected to receive the output signal of the comparator, the counter circuit being actuated by the first output state of the output signal of the at least one comparator to execute a counting cycle and presenting digital data corresponding to the counting cycle at the output thereof, the counter circuit further having a reset input for resetting the counter circuit;
    a state change detector connected to receive the output signal of the comparator, the state change detector generating a reset signal to the reset input of the counter circuit when the output signal of the comparator goes from the first state to the second state;
    a digital-to-analog converter for converting the output of the counter to an analog signal output;
    a ramp generator for providing a ramping output signal at the intermediate frequency;

a further comparator for comparing the ramping output
signal to the analog output signal to thereby generate a
phased pulse output signal; and a harmonic circuit for
generating the demodulating signal in response to the
phased pulse output signal.

6. A receiver for receiving phase shift key modulated burst signals including I and Q components, the burst signals including a prefix portion and a data portion, the I and Q components of the prefix portion being maintained at a predetermined relationship during at least a portion of the prefix portion, the receiver comprising:

an IF section for mixing received burst signals to an intermediate frequency signal, the intermediate frequency signal having a phase, an I-Q demodulator that includes a demodulator frequency generator for generating a demodulating signal having a frequency equal to or an integer multiple of the intermediate frequency signal to thereby extract the I and Q components of the received burst signals, the demodulating signal having a phase, and a phase adjustment circuit, responsive to the I and Q components that are maintained at the predetermined relationship, for adjusting the phase of the demodulating signal so that it is substantially in phase with the intermediate frequency signal.

7. A receiver as claimed in claim 6 wherein the I component and Q component of the prefix portion comprise the same amplitude.

8. A receiver as claimed in claim 6 wherein the I and Q the prefix portion form a vector at 45 degrees with respect to an I axis of an I-Q orthogonal system.

9. A receiver as claimed in claim 6 wherein the phase adjustment circuit comprises:

at least one comparator connected to receive the I and Q components from the I-Q demodulator and generating an output signal at a first output state when the predetermined relationship between the I and Q components of the prefix portion is not detected and a second output state when the predetermined relationship between the I and Q components is detected;

a counter circuit connected to receive the output signal of said at least one comparator, the counter circuit being actuated by the first output state of the output signal of said at least one comparator to execute a counting cycle and presenting digital data corresponding to the counting cycle at the output thereof, the counter circuit further having a reset input for resetting the counter circuit;

a state change detector connected to receive the output signal of the comparator, the state change detector generating a reset signal to the reset input of the counter circuit when the output signal of the comparator goes from the first state to the second state;

a digital-to-analog converter for converting the output of the counter to an analog signal output;

a ramp generator for providing a ramping output signal at the intermediate frequency;

a further comparator for comparing the ramping output signal to the analog output signal to thereby generate a phased pulse output signal; and a harmonic circuit for generating the demodulating signal from a phased pulse output signal.

10. A receiver as claimed in claim 7 wherein the phase adjustment circuit comprises:

at least one comparator connected to receive the I and Q components from the I-Q demodulator and generating an output signal at a first output state when the predetermined relationship between the I and Q components of the prefix portion is not detected and a second output state when the predetermined relationship between the I and Q components is detected;

a counter circuit connected to receive the output signal of said at least one comparator, the counter circuit being actuated by the first output state of the output signal of said at least one comparator to execute a counting cycle and presenting digital data corresponding to the counting cycle at the output thereof, the counter circuit further having a reset input for resetting the counter circuit;

a state change detector connected to receive the output signal of the comparator, the state change detector generating a reset signal to the reset input of the counter circuit when the output signal of the comparator goes from the first state to the second state;

a digital-to-analog converter for converting the output of the counter to an analog signal output;

a ramp generator for providing a ramping output signal at the intermediate frequency;

a further comparator for comparing the ramping output signal to the analog output signal to thereby generate a phased pulse output signal; and a harmonic circuit for generating the demodulating signal from a phased pulse output signal.

11. In a receiver for receiving phase shift key modulated signals that are transmitted at a symbol rate, a circuit for generating a symbol clock signal at a symbol rate and data clock signal at a data rate in response to baseband I and Q signals of the phase shift key modulated signals, the circuit comprising:

a transition detector for detecting a state transition of at least one of the baseband I and Q signals and for generating a state transition signal in response to the state transition;

a peak detector circuit for detecting occurrence of peak amplitude of at least one of the baseband I and Q signals and for generating a peak detected signal in response to occurrence of the peak amplitude; and a clock generator circuit for generating the symbol clock signal at the symbol rate and the data clock signal at the data rate, the clock generator circuit being responsive to the state transition signal and the peak detected signal to adjust the phase of the symbol clock signal.

12. In a receiver for receiving phase shift key modulated signals that are transmitted at a symbol rate, a circuit for determining the respective states of baseband I and Q signals of the phase shift key modulated signals, the circuit comprising:

a transition detector for detecting a state transition of at least one of the baseband I and Q signals and for generating a state transition signal in response to the state transition;

a peak detector circuit for detecting occurrence of peak amplitude of at least one of the baseband I and Q signals and for generating a peak detected signal in response to occurrence of the peak amplitude;

a clock generator circuit for generating a symbol clock signal at the symbol rate, the clock generator circuit being responsive to the state transition signal and the peak detected signal to adjust the phase of the symbol clock signal;

an analog-to-digital converter for sampling each of the baseband I and Q component signals at a predetermined rate to generate a first digital sample output stream from the baseband I component and a second digital sample output stream from the baseband Q component, each digital data sample of the first digital sample output stream being indicative of a logic state of the baseband I component at a respective sample time and each digital data sample of the second digital sample output stream being indicative of a logic state of the baseband Q component at a respective sample time, the predetermined rate being at least twice the Nyquist frequency of the baseband I and Q component signals;

a voter circuit receiving the first and second digital data sample streams, and, in response to occurrence of the symbol clock signal, comparing a current digital data sample of the first digital data sample output stream to prior and subsequent digital data samples of the first digital data sample output stream to provide an I state signal output and, in response to occurrence of the symbol clock signal, comparing a current digital data sample of the second digital data sample output stream to prior and subsequent digital data samples of the second digital data sample output stream to provide a Q state signal output.

13. In a receiver for receiving phase shift key modulated signals that are transmitted at a symbol rate, a circuit for determining the respective states of baseband I and Q signals of the phase shift key modulated signals, the circuit comprising:

a peak detector circuit for detecting occurrence of peak amplitude of at least one of the baseband I and Q signals and for generating a peak detected signal in response to occurrence of the peak amplitude;

a clock generator circuit for generating a symbol clock signal at the symbol rate, the clock generator circuit being responsive to the peak detected signal to adjust the phase of the symbol clock signal;

an analog-to-digital converter for sampling each of the baseband I and Q component signals at a predetermined rate to generate a first digital sample output stream from the baseband I component and a second digital sample output stream from the baseband Q component, each digital data sample of the first digital sample output stream being indicative of a logic state of the baseband I component at a respective sample time and each digital data sample of the second digital sample output stream being indicative of a logic state of the baseband Q component at a respective sample time, the predetermined rate being at least twice the Nyquist frequency of the baseband I and Q component signals;

a voter circuit receiving the first and second digital data sample streams, and, in response to occurrence of the symbol clock signal, comparing a current digital data sample of the first digital data sample output stream to prior and subsequent digital data samples of the first digital data sample output stream to provide an I state signal output based on the majority logic state of the digital samples of the first digital data output stream that are compared and, in response to occurrence of the symbol clock signal, comparing a current digital data sample of the second digital data sample output stream to prior and subsequent digital data samples of the second digital data sample output stream to provide a Q state signal output based on the majority logic state of the digital samples of the second digital data output stream that are compared.

14. In a receiver for receiving phase shift key modulated signals that are transmitted at a symbol rate, a circuit for determining the respective states of baseband I and Q signals of the phase shift key modulated signals, the circuit comprising:

a transition detector for detecting a state transition of at least one of the baseband I and Q signals and for generating a state transition signal in response to the state transition;

a clock generator circuit for generating a symbol clock signal at the symbol rate, the clock generator circuit being responsive to the state transition signal to adjust the phase of the symbol clock signal;

an analog-to-digital converter for sampling each of the baseband I and Q component signals at a predetermined rate to generate a first digital sample output stream from the baseband I component and a second digital sample output stream from the baseband Q component, each digital data sample of the first digital sample output stream being indicative of a logic state of the baseband I component at a respective sample time and each digital data sample of the second digital sample output stream being indicative of a logic state of the baseband Q component at a respective sample time, the predetermined rate being at least twice the Nyquist frequency of the baseband I and Q component signals;

a voter circuit receiving the first and second digital data sample streams, and, in response to occurrence of the symbol clock signal, comparing a current digital data sample of the first digital data sample output stream to prior and subsequent digital data samples of the first digital data sample output stream to provide an I state signal output based on the majority logic state of the digital samples of the first digital data output stream that are compared and, in response to occurrence of the symbol clock signal, comparing a current digital data sample of the second digital data sample output stream to prior and subsequent digital data samples of the second digital data sample output stream to provide a Q state signal output based on the majority logic state of the digital samples of the second digital data output stream that are compared.

15. In a receiver for receiving phase shift key modulated signals that are transmitted at a symbol rate, a circuit for determining the respective states of baseband I and Q signals of the phase shift key modulated signals, the circuit comprising:

a clock generator circuit for generating a symbol clock signal at the symbol rate;

an analog-to-digital converter for sampling each of the baseband I and Q component signals at a predetermined rate to generate a first digital sample output stream from the baseband I component and a second digital sample output stream from the baseband Q component, each digital data sample of the first digital sample output stream being indicative of a logic state of the baseband I component at a respective sample time and-each digital data sample of the second digital sample output stream being indicative of a logic state of the baseband Q component at a respective sample time, the predetermined rate being at least twice the Nyquist frequency of the baseband I and Q component signals;

a voter circuit receiving the first and second digital data sample streams, and, in response to occurrence of the symbol clock signal, comparing a current digital data sample of the first digital data sample output stream to prior and subsequent digital data samples of the first digital data sample output stream to provide an I state signal output based on the majority logic state of the digital samples of the first digital data output stream that are compared and, in response to occurrence of the symbol clock signal, comparing a current digital data sample of the second digital data sample output stream to prior and subsequent digital data samples of the second digital data sample output stream to provide a Q state signal output based on the majority logic state of the digital samples of the second digital data output stream that are compared.

16. A communications system comprising:
a transmitter for transmitting at a symbol rate phase shift key modulated burst signals including I and Q components on a transmission medium, the burst signals including a prefix portion and a data portion, I and Q components of the prefix portion being maintained at a predetermined relationship during at least a portion of the prefix portion; and
a receiver for receiving the phase shift key modulated burst signals from the transmission medium, the receiver comprising
  an IF section for mixing received burst signals to an intermediate frequency signal, the intermediate frequency signal having a phase,
  an I-Q demodulator that includes a demodulator frequency generator for generating a demodulating signal having a frequency equal to or an integer multiple of the intermediate frequency signal to thereby extract the baseband I and Q components of the received burst signals, the demodulating signal having a phase,
  a phase adjustment circuit, responsive to the I and Q components that are maintained at the predetermined relationship, for adjusting the phase of the demodulating signal so that it is substantially in phase with the intermediate frequency signal, and
  a clock circuit for generating a symbol clock signal and data clock signal from baseband I and Q components of the phase shift key modulated signals, the clock circuit comprising
    a transition detector for detecting a state transition of at least one of the baseband I and Q components and for generating a state transition signal in response to the state transition,
    a peak detector circuit for detecting occurrence of peak amplitude of at least one of the baseband I and Q components and for generating a peak detected signal in response to occurrence of the peak amplitude, and
    a clock generator circuit for generating the symbol clock signal at the symbol rate and the data clock signal at the data rate, the clock generator circuit being responsive to the state transition signal and the peak detected signal to adjust the phase of the symbol clock signal.

17. A communications system comprising:
a transmitter for transmitting at a symbol rate phase shift key modulated burst signals including I and Q components on a transmission medium, the burst signals including a prefix portion and a data portion, I and Q components of the prefix portion being maintained at a predetermined relationship during at least a portion of the prefix portion; and
a receiver for receiving the phase shift key modulated burst signals from the transmission medium, the receiver comprising
an IF section for mixing received burst signals to an intermediate frequency signal, the intermediate frequency signal having a phase,
an I-Q demodulator that includes a demodulator frequency generator for generating a demodulating signal having a frequency equal to or an integer multiple of the intermediate frequency signal to thereby extract the baseband I and Q components of the received burst signals, the demodulating signal having a phase,
a phase adjustment circuit, responsive to the I and Q components that are maintained at the predetermined relationship, for adjusting the phase of the demodulating signal so that it is substantially in phase with the intermediate frequency signal, and
a state-determining circuit for determining the respective states of baseband I and Q components of the phase shift key modulated signals, the state-determining circuit comprising
a transition detector for detecting a state transition of at least one of the baseband I and Q components and for generating a state transition signal in response to the state transition,
a peak detector circuit for detecting occurrence of peak amplitude of at least one of the baseband I and Q components and for generating a peak detected signal in response to occurrence of the peak amplitude,
a clock generator circuit for generating a symbol clock signal at the symbol rate, the clock generator circuit being responsive to the state transition signal and the peak detected signal to adjust the phase of the symbol clock signal,
an analog-to-digital converter for sampling each of the baseband I and Q components at a predetermined rate to generate a first digital sample output stream from the baseband I component and a second digital sample output stream from the baseband Q component, each digital data sample of the first digital sample output stream being indicative of a logic state of the baseband I component at a respective sample time and each digital data sample of the second digital sample output stream being indicative of a logic state of the baseband Q component at a respective sample time, the predetermined rate being at least twice the Nyquist frequency of the baseband I and Q components, and
a voter circuit receiving the first and second digital data sample streams, and, in response to occurrence of the symbol clock signal, comparing a current digital data sample of the first digital data sample output stream to prior and subsequent digital data samples of the first digital data sample output stream to provide an I state signal output and, in response to occurrence of the symbol clock signal, comparing a current digital data sample of the second digital data sample output stream to prior and subsequent digital data samples of the second digital data sample output stream to provide a Q state signal output.

18. A communications system comprising:
a transmitter for transmitting at a symbol rate phase shift key modulated burst signals including I and Q components on a transmission medium, the burst signals including a prefix portion and a data portion, I and Q components of the prefix portion being maintained at a predetermined relationship during at least a portion of the prefix portion; and
a receiver for receiving the phase shift key modulated burst signals from the transmission medium, the receiver comprising an IF section for mixing received burst signals to an intermediate frequency signal, the intermediate frequency signal having a phase, an I-Q demodulator that includes a demodulator frequency generator for generating a demodulating signal having a frequency equal to or an integer multiple of the intermediate frequency signal to thereby extract the baseband I and Q components of the received burst signals, the demodulating signal having a phase, a phase adjustment circuit, responsive to the I and Q components that are maintained at the predetermined relationship, for adjusting the phase of the demodulating signal so that it is substantially in phase with the intermediate frequency signal, and a state-determining circuit for determining the respective states of baseband I and Q components of the phase shift key modulated signals, the state-determining circuit comprising a peak detector circuit for detecting occurrence of peak amplitude of at least one of the baseband I and Q components and for generating a peak detected signal in response to occurrence of the peak amplitude, a clock generator circuit for generating a symbol clock signal at the symbol rate, the clock generator circuit being responsive to the peak detected signal to adjust the phase of the symbol clock signal, an analog-to-digital converter for sampling each of the baseband I and Q components at a predetermined rate to generate a first digital sample output stream from the baseband I component and a second digital sample output stream from the baseband Q component, each digital data sample of the first digital sample output stream being indicative of a logic state of the baseband I component at a respective sample time and each digital data sample of the second digital sample output stream being indicative of a logic state of the baseband Q component at a respective sample time, the predetermined rate being at least twice the Nyquist frequency of the baseband I and Q components, and a voter circuit receiving the first and second digital data sample streams, and, in response to occurrence of the symbol clock signal, comparing a current digital data sample of the first digital data sample output stream to prior and subsequent digital data samples of the first digital data sample output stream to provide an I state signal output based on the majority logic state of the digital samples of the first digital data output stream that are compared and, in response to occurrence of the symbol clock signal, comparing a current digital data sample of the second digital data sample output stream to prior and subsequent digital data samples of the second digital data sample output stream to provide a Q state signal output based on the majority logic state of the digital samples of the second digital data output stream that are compared.

19. A communications system comprising:

a transmitter for transmitting at a symbol rate phase shift key modulated burst signals including I and Q components on a transmission medium, the burst signals including a prefix portion and a data portion, I and Q components of the prefix portion being maintained at a predetermined relationship during at least a portion of the prefix portion; and a receiver for receiving the phase shift key modulated burst signals from the transmission medium, the receiver comprising an IF section for mixing received burst signals to an intermediate frequency signal, the intermediate frequency signal having a phase, an I-Q demodulator that includes a demodulator frequency generator for generating a demodulating signal having a frequency equal to or an integer multiple of the intermediate frequency signal to thereby extract the baseband I and Q components of the received burst signals, the demodulating signal having a phase, a phase adjustment circuit, responsive to the I and Q components that are maintained at the predetermined relationship, for adjusting the phase of the demodulating signal so that it is substantially in phase with the intermediate frequency signal, and a state-determining circuit for determining the respective states of the baseband I and Q components of the phase shift key modulated signals, the state-determining circuit comprising a transition detector for detecting a state transition of at least one of the baseband I and Q components and for generating a state transition signal in response to the state transition, a clock generator circuit for generating a symbol clock signal at the symbol rate, the clock generator circuit being responsive to the state transition signal to adjust the phase of the symbol clock signal, an analog-to-digital converter for sampling each of the baseband I and Q components at a predetermined rate to generate a first digital sample output stream from the baseband I component and a second digital sample output stream from the baseband Q component, each digital data sample of the first digital sample output stream being indicative of a logic state of the baseband I component at a respective sample time and each digital data sample of the second digital sample output stream being indicative of a logic state of the baseband Q component at a respective sample time, the predetermined rate being at least twice the Nyquist frequency of the baseband I and Q components, and a voter circuit receiving the first and second digital data sample streams, and, in response to occurrence of the symbol clock signal, comparing a current digital data sample of the first digital data sample output stream to prior and subsequent digital data samples of the first digital data sample output stream to provide an I state signal output based on the majority logic state of the digital samples of the first digital data output stream that are compared and, in response to occurrence of the symbol clock signal, comparing a current digital data sample of the second digital data sample output stream to prior and subsequent digital data samples of the second digital data sample output stream to provide a Q state signal output based on the majority logic state of the digital samples of the second digital data output stream that are compared.

20. A communications system comprising:

a transmitter for transmitting at a symbol rate phase shift key modulated burst signals including I and Q components on a transmission medium, the burst signals including a prefix portion and a data portion, I and Q components of the prefix portion being maintained at a predetermined relationship during at least a portion of the prefix portion; and a receiver for receiving the phase shift key modulated burst signals from the transmission medium, the receiver comprising an IF section for mixing received burst signals to an intermediate frequency signal, the intermediate frequency signal having a phase, an I-Q demodulator that includes a demodulator frequency generator for generating a demodulating signal having a frequency equal to or an integer multiple of the intermediate frequency signal to thereby extract the baseband I and Q components of the received burst signals, the demodulating signal having a phase, a phase adjustment circuit, responsive to the I and Q components that are maintained at the predetermined relationship, for adjusting the phase of the demodulating signal so that it is substantially in phase with the intermediate frequency signal, and a state-determining circuit for determining the respective states of baseband I and Q components of the phase shift key modulated signals, the state-determining circuit comprising a clock generator circuit for generating a symbol clock signal at the symbol rate, an analog-to-digital converter for sampling each of the baseband I and Q components at a predetermined rate to generate a first digital sample output stream from the baseband I component and a second digital sample output stream from the baseband Q component, each digital data sample of the first digital sample output stream being indicative of a logic state of the baseband I component at a respective sample time and each digital data sample of the second digital sample output stream being indicative of a logic state of the baseband Q component at a respective sample time, the predetermined rate being at least twice the Nyquist frequency of the baseband I and Q components, and a voter circuit receiving the first and second digital data sample streams, and, in response to occurrence of the symbol clock signal, comparing a current digital sample of the first digital data sample output stream to prior and subsequent digital data samples of the first digital data sample output stream to provide an I state signal output based on the majority logic state of the digital samples of the first digital data output stream that are compared and, in response to occurrence of the symbol clock signal, comparing a current digital data sample of the second digital data sample output stream to prior and subsequent digital data samples of the second digital data sample output stream to provide a Q state signal output based on the majority logic state of the digital samples of the second digital data output stream that are compared.

21. A receiver for receiving phase shift key modulated burst signals transmitted at a symbol rate including I and Q components, the burst signals including a prefix portion and a data portion, the I and Q components of the prefix portion being maintained at a predetermined relationship during at least a portion of the prefix portion, the receiver comprising:

an IF section for mixing received burst signals to an intermediate frequency signal, the intermediate frequency signal having a phase, an I-Q demodulator that includes a demodulator frequency generator for generating a demodulating signal having a frequency equal to or an integer multiple of the intermediate frequency signal to thereby extract the baseband I and Q components of the received burst signals, the demodulating signal having a phase, a phase adjustment circuit, responsive to the I and Q components that are maintained at the predetermined relationship, for adjusting the phase of the demodulating signal so that it is substantially in phase with the intermediate frequency signal, and a clock circuit for generating a symbol clock signal and data clock signal from baseband I and Q components of the phase shift key modulated signals, the clock circuit comprising a transition detector for detecting a state transition of at least one of the baseband I and Q components and for generating a state transition signal in response to the state transition, a peak detector circuit for detecting occurrence of peak amplitude of at least one of the baseband I and Q components and for generating a peak detected signal in response to occurrence of the peak amplitude, and a clock generator circuit for generating the symbol clock signal at the symbol rate and the data clock signal at the data rate, the clock generator circuit being responsive to the state transition signal and the peak detected signal to adjust the phase of the symbol clock signal.

22. A receiver for receiving phase shift key modulated burst signals transmitted at a symbol rate including I and Q components, the burst signals including a prefix portion and a data portion, the I and Q components of the prefix portion being maintained at a predetermined relationship during at least a portion of the prefix portion, the receiver comprising:

an IF section for mixing received burst signals to an intermediate frequency signal, the intermediate frequency signal having a phase, an I-Q demodulator that includes a demodulator frequency generator for generating a demodulating signal having a frequency equal to or an integer multiple of the intermediate frequency signal to thereby extract the baseband I and Q components of the received burst signals, the demodulating signal having a phase, a phase adjustment circuit, responsive to the I and Q components that are maintained at the predetermined relationship, for adjusting the phase of the demodulating signal so that it is substantially in phase with the intermediate frequency signal, and a state-determining circuit for determining the respective states of baseband I and Q components of the phase shift key modulated signals, the state-determining circuit comprising a transition detector for detecting a state transition of at least one of the baseband I and Q components and for generating a state transition signal in response to the state transition, a peak detector circuit for detecting occurrence of peak amplitude of at least one of the baseband I and Q components and for generating a peak detected signal in response to occurrence of the peak amplitude, a clock generator circuit for generating a symbol clock signal at the symbol rate, the clock generator circuit being responsive to the state transition signal and the peak detected signal to adjust the phase of the-symbol clock signal, an analog-to-digital converter for sampling each of the baseband I and Q components at a predetermined rate to generate a first digital sample output stream from the baseband I component and a second digital sample output stream from the baseband Q component, each digital data sample of the first digital sample output stream being indicative of a logic state of the baseband I component at a respective sample time and each digital data sample of the second digital sample output stream being indicative of a logic state of the baseband Q component at a respective sample time, the predetermined rate being at least twice the Nyquist frequency of the baseband I and Q components, and a voter circuit receiving the first and second digital data sample streams, and, in response to occurrence of the symbol clock signal, comparing a current digital data sample of the first digital data sample output stream to prior and subsequent digital data samples of the first digital data sample output stream to provide an I state signal output and, in response to occurrence of the symbol clock signal, comparing a current digital data sample of the second digital data sample output stream to prior and subsequent digital data samples of the second digital data sample output stream to provide a Q state signal output.

23. A receiver for receiving phase shift key modulated burst signals transmitted at a symbol rate including I and Q components, the burst signals including a prefix portion and a data portion, the I and Q components of the prefix portion being maintained at a predetermined relationship during at least a portion of the prefix portion, the receiver comprising:

an IF section for mixing received burst signals to an intermediate frequency signal, the intermediate frequency signal having a phase, an I-Q demodulator that includes a demodulator frequency generator for generating a demodulating signal having a frequency equal to or an integer multiple of the intermediate frequency signal to thereby extract the baseband I and Q components of the received burst signals, the demodulating signal having a phase, a phase adjustment circuit, responsive to the I and Q components that are maintained at the predetermined relationship, for adjusting the phase of the demodulating signal so that it is substantially in phase with the intermediate frequency signal, and a state-determining circuit for determining the respective states of baseband I and Q components of the phase shift key modulated signals, the state-determining circuit comprising a peak detector circuit for detecting occurrence of peak amplitude of at least one of the baseband I and Q components and for generating a peak detected signal in response to occurrence of the peak amplitude, a clock generator circuit for generating a symbol clock signal at the symbol rate, the clock generator circuit being responsive to the peak detected signal to adjust the phase of the symbol clock signal, an analog-to-digital converter for sampling each of the baseband I and Q components at a predetermined rate to generate a first digital sample output stream from the baseband I component and a second digital sample output stream from the baseband Q component, each digital data sample of the first digital sample output stream being indicative of a logic state of the baseband I component at a respective sample time and each digital data sample of the second digital sample output stream being indicative of a logic state of the baseband Q component at a respective sample time, the predetermined rate being at least twice the Nyquist frequency of the baseband I and Q components, and a voter circuit receiving the first and second digital data sample streams, and, in response to occurrence of the symbol clock signal, comparing a current digital data sample of the first digital data sample output stream to prior and subsequent digital data samples of the first digital data sample output stream to provide an I state signal output based on the majority logic state of the digital samples of the first digital data output stream that are compared and, in response to occurrence of the symbol clock signal, comparing a current digital data sample of the second digital data sample output stream to prior and subsequent digital data samples of the second digital data sample output stream to provide a Q state signal output based on the majority logic state of the digital samples of the second digital data output stream that are compared.

24. A receiver for receiving phase shift key modulated burst signals transmitted at a symbol rate including I and Q components, the burst signals including a prefix portion and a data portion, the I and Q components of the prefix portion being maintained at a predetermined relationship during at least a portion of the prefix portion, the receiver comprising:

an IF section for mixing received burst signals to an intermediate frequency signal, the intermediate frequency signal having a phase, an I-Q demodulator that includes a demodulator frequency generator for generating a demodulating signal having a frequency equal to or an integer multiple of the intermediate frequency signal to thereby extract the baseband I and Q components of the received burst signals, the demodulating signal having a phase, a phase adjustment circuit, responsive to the I and Q components that are maintained at the predetermined relationship, for adjusting the phase of the demodulating signal so that it is substantially in phase with the intermediate frequency signal, and a state-determining circuit for determining the respective states of the baseband I and Q components of the phase shift key modulated signals, the state-determining circuit comprising a transition detector for detecting a state transition of at least one of the baseband I and Q components and for generating a state transition signal in response to the state transition, a clock generator circuit for generating a symbol clock signal at the symbol rate, the clock generator circuit being responsive to the state transition signal to adjust the phase of the symbol clock signal, an analog-to-digital converter for sampling each of the baseband I and Q components at a predetermined rate to generate a first digital sample output stream from the baseband I component and a second digital sample output stream from the baseband Q component, each digital data sample of the first digital sample output stream being indicative of a logic state of the baseband I component at a respective sample time and each digital data sample of the second digital sample output stream being indicative of a logic state of the baseband Q component at a respective sample time, the predetermined rate being at least twice the Nyquist frequency of the baseband I and Q components, and a voter circuit receiving the first and second digital data sample streams, and, in response to occurrence of the symbol clock signal, comparing a current digital data sample of the first digital data sample output stream to prior and subsequent digital data samples of the first digital data sample output stream to provide an I state signal output based on the majority logic state of the digital samples of the first digital data output stream that are compared and, in response to occurrence of the symbol clock signal, comparing a current digital data sample of the second digital data sample output stream to prior and subsequent digital data samples of the second digital data sample output stream to provide a Q state signal output based on the majority logic state of the digital samples of the second digital data output stream that are compared.

25. A receiver for receiving phase shift key modulated burst signals transmitted at a symbol rate including I and Q components, the burst signals including a prefix portion and a data portion, the I and Q components of the prefix portion being maintained at a predetermined relationship during at least a portion of the prefix portion, the receiver comprising:

an IF section for mixing received burst signals to an intermediate frequency signal, the intermediate frequency signal having a phase, an I-Q demodulator that includes a demodulator frequency generator for generating a demodulating signal having a frequency equal to or an integer multiple of the intermediate frequency signal to thereby extract the baseband I and Q components of the received burst signals, the demodulating signal having a phase, a phase adjustment circuit, responsive to the I and Q components that are maintained at the predetermined relationship, for adjusting the phase of the demodulating signal so that it is substantially in phase with the intermediate frequency signal, and a state-determining circuit for determining the respective states of baseband I and Q components of the phase shift key modulated signals, the state-determining circuit comprising a clock generator circuit for generating a symbol clock signal at the symbol rate, an analog-to-digital converter for sampling each of the baseband I and Q components at a predetermined rate to generate a first digital sample output stream from the baseband I component and a second digital sample output stream from the baseband Q component, each digital data sample of the first digital sample output stream being indicative of a logic state of the baseband I component at a respective sample time and each digital data sample of the second digital sample output stream being indicative of a logic state of the baseband Q component at a respective sample time, the predetermined rate being at least twice the Nyquist frequency of the baseband I and Q components, and a voter circuit receiving the first and second digital data sample streams, and, in response to occurrence of the symbol clock signal, comparing a current digital sample of the first digital data sample output stream to prior and subsequent digital data samples of the first digital data sample output stream to provide an I state signal output based on the majority logic state of the digital samples of the first digital data output stream that are compared and, in response to occurrence of the symbol clock signal, comparing a current digital data sample of the second digital data sample output stream to prior and subsequent digital data samples of the second digital data sample output stream to provide a Q state signal output based on the majority logic state of the digital samples of the second digital data output stream that are compared.

26. A method of phase adjusting a demodulating signal comprising:

transmitting phase shift key modulated burst signals including I and Q components, the burst signals including a prefix portion and a data portion, I and Q components of the prefix portion being maintained at a predetermined relationship during at least a portion of the prefix portion;

receiving the phase shift key modulated burst signals;

mixing received burst signals to an intermediate frequency signal, the intermediate frequency signal having a phase, generating a demodulating signal having a frequency equal to or an integer multiple of the intermediate frequency signal to thereby extract the I and Q components of the received burst signals, the demodulating signal having a phase, and adjusting the phase of the demodulating signal in response to the I and Q components that are maintained at the predetermined relationship so that the demodulating signal is substantially in phase with the intermediate frequency signal.

27. The method of claim 26 and further comprising maintaining the I and Q components of the prefix portion at the same amplitude.

28. The method of claim 26 wherein the I and Q components of the prefix portion form a vector at 45 degrees with respect to an I axis of an I-Q orthogonal system.

29. The method of claim 26 wherein the adjusting the phase comprises:

generating an output signal at a first output state when the predetermined relationship between the I and Q components of the prefix portion is not detected and a second output state when the predetermined relationship between the I and Q components is detected;

executing a counting cycle and presenting digital counting data corresponding to the counting cycle in response to the first output state of the output signal;

resetting the counting cycle when the output signal goes from the first state to the second state;

converting the digital counting data to an analog signal;

providing a ramping output signal at the intermediate frequency;

comparing the ramping output signal to the analog signal;

generating a phased pulse output signal in response to the comparing; and generating the demodulating signal in response to the phased pulse output signal.

30. The method of claim 27 wherein the adjusting the phase comprises:

generating an output signal at a first output state when the predetermined relationship between the I and Q components of the prefix portion is not detected and a second output state when the predetermined relationship between the I and Q components is detected;

executing a counting cycle and presenting counting digital data corresponding to the counting cycle in response to the first output state of the output signal;

resetting the counting cycle when the output signal goes from the first state to the second state;

converting the digital counting data to an analog signal;

providing a ramping output signal at the intermediate frequency;

comparing the ramping output signal to the analog signal;

generating a phased pulse output signal in response to the comparing; and generating the demodulating signal in response to the phased pulse output signal.

31. In a receiver for receiving phase shift key modulated burst signals including I and Q components, the burst signals including a prefix portion and a data portion, the I and Q components of the prefix portion being maintained at a predetermined relationship during at least a portion of the prefix portion, a method of phase adjustment comprising:

mixing received burst signals to an intermediate frequency signal, the intermediate frequency signal having a phase, generating a demodulating signal having a frequency equal to or an integer multiple of the intermediate frequency signal to thereby extract the I and Q components of the received burst signals, the demodulating signal having a phase; and adjusting the phase of the demodulating signal so that it is substantially in phase with the intermediate frequency signal in response to the I and Q components that are maintained at the predetermined relationship.

32. The method of claim 31 further comprising maintaining the I and Q components of the prefix portion at the same amplitude.

33. The method of claim 31 wherein the I and Q the prefix portion form a vector at 45 degrees with respect to an I axis of an I-Q orthogonal system.

34. The method of claim 31 wherein the adjusting the phase comprises:

generating an output signal at a first output state when the predetermined relationship between the I and Q components of the prefix portion is not detected and a second output state when the predetermined relationship between the I and Q components is detected;

executing a counting cycle and presenting digital counting data corresponding to the counting cycle in response to the first output state of the output signal;

resetting the counting cycle when the output signal goes from the first state to the second state;

converting the digital counting data to an analog signal;

providing a ramping output signal at the intermediate frequency;

comparing the ramping output signal to the analog signal;

generating a phased pulse output signal in response to the comparing; and generating the demodulating signal in response to the phased pulse output signal.

35. The method of claim 32 wherein the adjusting the phase comprises:

generating an output signal at a first output state when the predetermined relationship between the I and Q components of the prefix portion is not detected and a second output state when the predetermined relationship between the I and Q components is detected;

executing a counting cycle and presenting digital counting data corresponding to the counting cycle in response to the first output state of the output signal;

resetting the counting cycle when the output signal goes from the first state to the second state;

converting the digital counting data to an analog signal;

providing a ramping output signal at the intermediate frequency;

comparing the ramping output signal to the analog signal;

generating a phased pulse output signal in response to the comparing; and generating the demodulating signal in response to the phased pulse output signal.

36. In a receiver for receiving phase shift key modulated signals that are transmitted at a symbol rate, a method of generating a symbol clock signal at a symbol rate and data clock signal at a data rate from baseband I and Q components of the phase shift key modulated signals, the method comprising:

detecting a state transition of at least one of the baseband I and Q components;

generating a state transition signal in response to the state transition;

detecting occurrence of peak amplitude of at least one of the baseband I and Q components;

generating a peak detected signal in response to occurrence of the peak amplitude; and generating the symbol clock signal at the symbol rate and the data clock signal at the data rate in response to the state transition signal and the peak detected signal to adjust the phase of the symbol clock signal.

37. In a receiver for receiving phase shift key modulated signals that are transmitted at a symbol rate, a method of determining the respective states of baseband I and Q signals of the phase shift key modulated signals, the method comprising:

detecting a state transition of at least one of the baseband I and Q signals;

generating a state transition signal in response to the state transition;

detecting occurrence of peak amplitude of at least one of the baseband I and Q signals;

generating a peak detected signal in response to occurrence of the peak amplitude;

generating a symbol clock signal at the symbol rate;

adjusting the phase of the symbol clock signal in response to the state transition signal and the peak detected signal;

sampling each of the baseband I and Q component signals at a predetermined rate to generate a first digital sample output stream from the baseband I component and a second digital sample output stream from the baseband Q component, each digital data sample of the first digital sample output stream being indicative of a logic state of the baseband I component at a respective sample time and each digital data sample of the second digital sample output stream being indicative of a logic state of the baseband Q component at a respective sample time, the predetermined rate being at least twice the Nyquist frequency of the baseband I and Q component signals; and receiving the first and second digital data sample streams, and, in response to occurrence of the symbol clock signal, comparing a current digital data sample of the first digital data sample output stream to prior and subsequent digital data samples of the first digital data sample output stream to provide an I state signal output and, in response to occurrence of the symbol clock signal, comparing a current digital data sample of the second digital data sample output stream to prior and subsequent digital data samples of the second digital data sample output stream to provide a Q state signal output.

38. In a receiver for receiving phase shift key modulated signals that are transmitted at a symbol rate, a method of determining the respective states of baseband I and Q signals of the phase shift key modulated signals, the method comprising:

detecting occurrence of peak amplitude of at least one of the baseband I and Q signals;

generating a peak detected signal in response to occurrence of the peak amplitude;

generating a symbol clock signal at the symbol rate;

adjusting the phase of the symbol clock signal in response to the peak detected signal;

sampling each of the baseband I and Q component signals at a predetermined rate to generate a first digital sample output stream from the baseband I component and a second digital sample output stream from the baseband Q component, each digital data sample of the first digital sample output stream being indicative of a logic state of the baseband I component at a respective sample time and each digital data sample of the second digital sample output stream being indicative of a logic state of the baseband Q component at a respective sample time, the predetermined rate being at least twice the Nyquist frequency of the baseband I and Q component signals; and receiving the first and second digital data sample streams, and, in response to occurrence of the symbol clock signal, comparing a current digital data sample of the first digital data sample output stream to prior and subsequent digital data samples of the first digital data sample output stream to provide an I state signal output based on the majority logic state of the digital samples of the first digital data output stream that are compared and, in response to occurrence of the symbol clock signal, comparing a current digital data sample of the second digital data sample output stream to prior and subsequent digital data samples of the second digital data sample output stream to provide a Q state signal output based on the majority logic state of the digital samples of the second digital data output stream that are compared.

39. In a receiver for receiving phase shift key modulated signals that are transmitted at a symbol rate, a method of determining the respective states of baseband I and Q signals of the phase shift key modulated signals, the method comprising:

detecting a state transition of at least one of the baseband I and Q signals;

generating a state transition signal in response to the state transition;

generating the symbol clock signal at the symbol rate;

adjusting the phase of the symbol clock signal in response to the state transition signal;

sampling each of the baseband I and Q component signals at a predetermined rate to generate a first digital sample output stream from the baseband I component and a second digital sample output stream from the baseband Q component, each digital data sample of the first digital sample output stream being indicative of a logic state of the baseband I component at a respective sample time and each digital data sample of the second digital sample output stream being indicative of a logic state of the baseband Q component at a respective sample time, the predetermined rate being at least twice the Nyquist frequency of the baseband I and Q component signals; and receiving the first and second digital data sample streams, and, in response to occurrence of the symbol clock signal, comparing a current digital data sample of the first digital data sample output stream to prior and subsequent digital data samples of the first digital data sample output stream to provide an I state signal output based on the majority logic state of the digital samples of the first digital data output stream that are compared and, in response to occurrence of the symbol clock signal, comparing a current digital data sample of the second digital data sample output stream to prior and subsequent digital data samples of the second digital data sample output stream to provide a Q state signal output based on the majority logic state of the digital samples of the second digital data output stream that are compared.

40. In a receiver for receiving phase shift key modulated signals that are transmitted at a symbol rate, a method of determining the respective states of baseband I and Q signals of the phase shift key modulated signals, the method comprising:

generating a symbol clock signal at the symbol rate;

sampling each of the baseband I and Q component signals at a predetermined rate to generate a first digital sample output stream from the baseband I component and a second digital sample output stream from the baseband Q component, each digital data sample of the first digital sample output stream being indicative of a logic state of the baseband I component at a respective sample time and each digital data sample of the second digital sample output stream being indicative of a logic state of the baseband Q component at a respective sample time, the predetermined rate being at least twice the Nyquist frequency of the baseband I and Q component signals; and receiving the first and second digital data sample streams, and, in response to occurrence of the symbol clock signal, comparing a current digital data sample of the first digital data sample output stream to prior and subsequent digital data samples of the first digital data sample output stream to provide an I state signal output based on the majority logic state of the digital samples of the first digital data output stream that are compared and, in response to occurrence of the symbol clock signal, comparing a current digital data sample of the second digital data sample output stream to prior and subsequent digital data samples of the second digital data sample output stream to provide a Q state signal output based on the majority logic state of the digital samples of the second digital data output stream that are compared.

41. Apparatus for phase adjusting a demodulating signal comprising:

means for transmitting phase shift key modulated burst signals including I and Q components, the burst signals including a prefix portion and a data portion, I and Q components of the prefix portion being maintained at a predetermined relationship during at least a portion of the prefix portion;

means for receiving the phase shift key modulated burst signals;

means for mixing received burst signals to an intermediate frequency signal, the intermediate frequency signal having a phase, means for generating a demodulating signal having a frequency equal to or an integer multiple of the intermediate frequency signal to thereby extract the I and Q components of the received burst signals, the demodulating signal having a phase, and means for adjusting the phase of the demodulating signal in response to the I and Q components that are maintained at the predetermined relationship so that the demodulating signal is substantially in phase with the intermediate frequency signal.

42. The apparatus of claim 41 and further comprising means for maintaining the I and Q components of the prefix portion at the same amplitude.

43. The apparatus of claim 41 wherein the I and Q components of the prefix portion form a vector at 45 degrees with respect to an I axis of an I-Q orthogonal system.

44. The apparatus of claim 41 wherein the means for adjusting the phase comprises:
   means for generating an output signal at a first output state when the predetermined relationship between the I and Q components of the prefix portion is not detected and a second output state when the predetermined relationship between the I and Q components is detected;
   means for executing a counting cycle and presenting digital counting data corresponding to the counting cycle in response to the first output state of the output signal;
   means for resetting the counting cycle when the output signal goes from the first state to the second state;
   means for converting the digital counting data to an analog signal;
   means for providing a ramping output signal at the intermediate frequency;
   means for comparing the ramping output signal to the analog signal;
   means for generating a phased pulse output signal in response to the comparing; and
   means for generating the demodulating signal in response to the phased pulse output signal.

45. The apparatus of claim 42 wherein the means for adjusting the phase comprises:
   means for generating an output signal at a first output state when the predetermined relationship between the I and Q components of the prefix portion is not detected and a second output state when the predetermined relationship between the I and Q components is detected;
   means for executing a counting cycle and presenting counting digital data corresponding to the counting cycle in response to the first output state of the output signal;
   means for resetting the counting cycle when the output signal goes from the first state to the second state;
   means for converting the digital counting data to an analog signal;
   means for providing a ramping output signal at the intermediate frequency;
   means for comparing the ramping output signal to the analog signal;
   means for generating a phased pulse output signal in response to the comparing; and
   means for generating the demodulating signal in response to the phased pulse output signal.

46. In a receiver for receiving phase shift key modulated burst signals including I and Q components, the burst signals including a prefix portion and a data portion, the I and Q components of the prefix portion being maintained at a predetermined relationship during at least a portion of the prefix portion, apparatus for phase adjustment comprising:
   means for mixing received burst signals to an intermediate frequency signal, the intermediate frequency signal having a phase,
   means for generating a demodulating signal having a frequency equal to or an integer multiple of the intermediate frequency signal to thereby extract the I and Q components of the received burst signals, the demodulating signal having a phase; and
   means for adjusting the phase of the demodulating signal so that it is substantially in phase with the intermediate frequency signal in response to the I and Q components that are maintained at the predetermined relationship.

47. The apparatus of claim 46 further comprising means for maintaining the I and Q components of the prefix portion at the same amplitude.

48. The apparatus of claim 46 wherein the I and Q the prefix portion form a vector at 45 degrees with respect to an I axis of an I-Q orthogonal system.

49. The apparatus of claim 46 wherein the means for adjusting the phase comprises:
   means for generating an output signal at a first output state when the predetermined relationship between the I and Q components of the prefix portion is not detected and a second output state when the predetermined relationship between the I and Q components is detected;
   means for executing a counting cycle and presenting digital counting data corresponding to the counting cycle in response to the first output state of the output signal;
   means for resetting the counting cycle when the output signal goes from the first state to the second state;
   means for converting the digital counting data to an analog signal;
   means for providing a ramping output signal at the intermediate frequency;
   means for comparing the ramping output signal to the analog signal;
   means for generating a phased pulse output signal in response to the comparing; and
   means for generating the demodulating signal in response to the phased pulse output signal.

50. The apparatus of claim 47 wherein the means for adjusting the phase comprises:
   means for generating an output signal at a first output state when the predetermined relationship between the I and Q components of the prefix portion is not detected and a second output state when the predetermined relationship between the I and Q components is detected;
   means for executing a counting cycle and presenting digital counting data corresponding to the counting cycle in response to the first output state of the output signal;
   means for resetting the counting cycle when the output signal goes from the first state to the second state;
   means for converting the digital counting data to an analog signal;
   means for providing a ramping output signal at the intermediate frequency;
   means for comparing the ramping output signal to the analog signal;
   means for generating a phased pulse output signal in response to the comparing; and
   means for generating the demodulating signal in response to the phased pulse output signal.

51. In a receiver for receiving phase shift key modulated signals that are transmitted at a symbol rate, apparatus for generating a symbol clock signal at a symbol rate and data clock signal at a data rate from baseband I and Q components of the phase shift key modulated signals, the apparatus comprising:
   means for detecting a state transition of at least one of the baseband I and Q components;
   means for generating a state transition signal in response to the state transition;

means for detecting occurrence of peak amplitude of at least one of the baseband I and Q components;

means for generating a peak detected signal in response to occurrence of the peak amplitude; and means for generating the symbol clock signal at the symbol rate and the data clock signal at the data rate in response to the state transition signal and the peak detected signal to adjust the phase of the symbol clock signal.

52. In a receiver for receiving phase shift key modulated signals that are transmitted at a symbol rate, apparatus for determining the respective states of baseband I and Q signals of the phase shift key modulated signals, the apparatus comprising:

means for detecting a state transition of at least one of the baseband I and Q signals;

means for generating a state transition signal in response to the state transition;

means for detecting occurrence of peak amplitude of at least one of the baseband I and Q signals;

means for generating a peak detected signal in response to occurrence of the peak amplitude;

means for generating a symbol clock signal at the symbol rate;

means for adjusting the phase of the symbol clock signal in response to the state transition signal and the peak detected signal;

means for sampling each of the baseband I and Q component signals at a predetermined rate to generate a first digital sample output stream from the baseband I component and a second digital sample output stream from the baseband Q component, each digital data sample of the first digital sample output stream being indicative of a logic state of the baseband I component at a respective sample time and each digital data sample of the second digital sample output stream being indicative of a logic state of the baseband Q component at a respective sample time, the predetermined rate being at least twice the Nyquist frequency of the baseband I and Q component signals; and means for receiving the first and second digital data sample streams, and, in response to occurrence of the symbol clock signal, comparing a current digital data sample of the first digital data sample output stream to prior and subsequent digital data samples of the first digital data sample output stream to provide an I state signal output and, in response to occurrence of the symbol clock signal, comparing a current digital data sample of the second digital data sample output stream to prior and subsequent digital data samples of the second digital data sample output stream to provide a Q state signal output.

53. In a receiver for receiving phase shift key modulated signals that are transmitted at a symbol rate, apparatus for determining the respective states of baseband I and Q signals of the phase shift key modulated signals, the apparatus comprising:

means for detecting occurrence of peak amplitude of at least one of the baseband I and Q signals;

means for generating a peak detected signal in response to occurrence of the peak amplitude;

means for generating a symbol clock signal at the symbol rate;

means for adjusting the phase of the symbol clock signal in response to the peak detected signal;

means for sampling each of the baseband I and Q component signals at a predetermined rate to generate a first digital sample output stream from the baseband I component and a second digital sample output stream from the baseband Q component, each digital data sample of the first digital sample output stream being indicative of a logic state of the baseband I component at a respective sample time and each digital data sample of the second digital sample output stream being indicative of a logic state of the baseband Q component at a respective sample time, the predetermined rate being at least twice the Nyquist frequency of the baseband I and Q component signals; and means for receiving the first and second digital data sample streams, and, in response to occurrence of the symbol clock signal, comparing a current digital data sample of the first digital data sample output stream to prior and subsequent digital data samples of the first digital data sample output stream to provide an I state signal output based on the majority logic state of the digital samples of the first digital data output stream that are compared and, in response to occurrence of the symbol clock signal, comparing a current digital data sample of the second digital data sample output stream to prior and subsequent digital data samples of the second digital data sample output stream to provide a Q state signal output based on the majority logic state of the digital samples of the second digital data output stream that are compared.

54. In a receiver for receiving phase shift key modulated signals that are transmitted at a symbol rate, apparatus for determining the respective states of baseband I and Q signals of the phase shift key modulated signals, the apparatus comprising:

means for detecting a state transition of at least one of the baseband I and Q signals;

means for generating a state transition signal in response to the state transition;

means for generating the symbol clock signal at the symbol rate;

means for adjusting the phase of the symbol clock signal in response to the state transition signal;

means for sampling each of the baseband I and Q component signals at a predetermined rate to generate a first digital sample output stream from the baseband I component and a second digital sample output stream from the baseband Q component, each digital data sample of the first digital sample output stream being indicative of a logic state of the baseband I component at a respective sample time and each digital data sample of the second digital sample output stream being indicative of a logic state of the baseband Q component at a respective sample time, the predetermined rate being at least twice the Nyquist frequency of the baseband I and Q component signals; and means for receiving the first and second digital data sample streams, and, in response to occurrence of the symbol clock signal, comparing a current digital data sample of the first digital data sample output stream to prior and subsequent digital data samples of the first digital data sample output stream to provide an I state signal output based on the majority logic state of the digital samples of the first digital data output stream that are compared and, in response to occurrence of the symbol clock signal, comparing a current digital data sample of the second digital data sample output stream to prior and subsequent digital data sample s of the second digital data sample output stream to provide a Q state signal output based on the majority logic state of the digital samples of the second digital data output stream that are compared.

55. In a receiver for receiving phase shift key modulated signals that are transmitted at a symbol rate, apparatus for determining the respective states of baseband I and Q signals of the phase shift key modulated signals, the apparatus comprising:

means for generating a symbol clock signal at the symbol rate;

means for sampling each of the baseband I and Q component signals at a predetermined rate to generate a first digital sample output stream from the baseband I component and a second digital sample output stream from the baseband Q component, each digital data sample of the first digital sample output stream being indicative of a logic state of the baseband I component at a respective sample time and each digital data sample of the second digital sample output stream being indicative of a logic state of the baseband Q component at a respective sample time, the predetermined rate being at least twice the Nyquist frequency of the baseband I and Q component signals; and means for receiving the first and second digital data sample streams, and, in response to occurrence of the symbol clock signal, comparing a current digital data sample of the first digital data sample output stream to prior and subsequent digital data samples of the first digital data sample output stream to provide an I state signal output based on the majority logic state of the digital samples of the first digital data output stream that are compared and, in response to occurrence of the symbol clock signal, comparing a current digital data sample of the second digital data sample output stream to prior and subsequent digital data samples of the second digital data sample output stream to provide a Q state signal output based on the majority logic state of the digital samples of the second digital data output stream that are compared.

56. A communications system comprising:

a transmitter for transmitting phase shift key modulated burst signals including I and Q components on a transmission medium, the burst signals including a prefix portion and a data portion, I and Q components of the prefix portion being maintained at a predetermined relationship during at least a portion of the prefix portion; and a receiver for receiving the phase shift key modulated burst signals from the transmission medium, the receiver comprising an IF section for mixing received burst signals to an intermediate frequency signal, the intermediate frequency signal having a phase, an I-Q demodulator that includes a demodulator frequency generator for generating a demodulating signal having a frequency equal to or an integer multiple of the intermediate frequency signal to thereby extract the I and Q components of the received burst signals, the demodulating signal having a phase, and a phase adjustment circuit, responsive to the I and Q components that are maintained at the predetermined relationship, for adjusting the phase of the demodulating signal so that the demodulating signal is substantially in phase with the intermediate frequency signal, said phase adjustment circuit comprising at least one comparator connected to receive the I and Q components from the I-Q demodulator and generating an output signal at a first output state when the predetermined relationship between the I and Q components of the prefix portion is not detected and a second output state when the predetermined relationship between the I and Q components is detected, a counter circuit connected to receive the output signal of the at least one comparator, the counter circuit being actuated by the first output state of the output signal of the at least one comparator to execute a counting cycle and presenting digital data corresponding to the counting cycle at the output thereof, the counter circuit further having a reset input for resetting the counter circuit, a state change detector connected to receive the output signal of the comparator, the state change detector generating a reset signal to the reset input of the counter circuit when the output signal of the comparator goes from the first state to the second state, a digital-to-analog converter for converting the output of the counter to an analog signal output, a ramp generator for providing a ramping output signal at the intermediate frequency, a further comparator for comparing the ramping output signal to the analog output signal to thereby generate a phased pulse output signal, and a harmonic circuit for generating the demodulating signal in response to the phased pulse output signal.

57. A communications system comprising:

a transmitter for transmitting phase shift key modulated burst signals including I and Q components on a transmission medium, the burst signals including a prefix portion and a data portion, I and Q components of the prefix portion being maintained at a the same amplitude during at least a portion of the prefix portion; and a receiver for receiving the phase shift key modulated burst signals from the transmission medium, the receiver comprising an IF section for mixing received burst signals to an intermediate frequency signal, the intermediate frequency signal having a phase, an I-Q demodulator that includes a demodulator frequency generator for generating a demodulating signal having a frequency equal to or an integer multiple of the intermediate frequency signal to thereby extract the I and Q components of the received burst signals, the demodulating signal having a phase, and a phase adjustment circuit, responsive to the I and Q components that are maintained at the predetermined relationship, for adjusting the phase of the demodulating signal so that the demodulating signal is substantially in phase with the intermediate frequency signal, said phase adjustment circuit comprising at least one comparator connected to receive the I and Q components from the I-Q demodulator and generating an output signal at a first output state when the predetermined relationship between the I and Q components of the prefix portion is not detected and a second output state when the predetermined relationship between the I and Q components is detected, a counter circuit connected to receive the output signal of the at least one comparator, the counter circuit being actuated by the first output state of the output signal of the at least one comparator to execute a counting cycle and presenting digital data corresponding to the counting cycle at the output thereof, the counter circuit further having a reset input for resetting the counter circuit, a state change detector connected to receive the output signal of the comparator, the state change detector generating a reset signal to the reset input of the counter circuit when the output signal of the comparator goes from the first state to the second state, a digital-to-analog converter for converting the output of the counter to an analog signal output, a ramp generator for providing a ramping output signal at the intermediate frequency, a further comparator for comparing the ramping output signal to the analog output signal to thereby generate a phased pulse output signal, and a harmonic circuit for generating the demodulating signal in response to the phased pulse output signal.

58. A receiver comprising:

a mixer that receives a first signal having I and Q components and a second signal, and mixes the first signal and the second signal to output an intermediate frequency signal having a phase;

a demodulator that receives a third signal having a phase and the intermediate signal, and mixes the third signal and the intermediate signal to output a first baseband signal that represents an I component of the first signal, and a second baseband signal that represents a Q component of the first signal;

a comparator circuit that receives the first baseband signal and the second baseband signal, outputs a comparator signal with a first logic state when the phase of the intermediate signal and the phase of the third signal are equal, and with a second logic state when the phase of the first signal and the phase of the third signal are not equal; and a phase adjustment circuit that adjusts the phase of the third signal in response to a logic state of the comparator signal.

59. The receiver of claim 58 wherein the first signal has a first frequency, the second signal has a second frequency, and the intermediate frequency signal having a frequency equal to the first frequency minus the second frequency.

60. The receiver of claim 58 wherein the phase adjustment circuit includes:

a counter connected to the comparator to receive the comparator signal, the counter starting a count when the logic state of the comparator signal transitions to the second logic state, and stops counting in response to a state change signal; and a state change detector connected to the comparator to receive the comparator signal, the state change detector outputting the state change signal when the logic state of the comparator signal transitions to the first logic state.

61. The receiver of claim 60 wherein the counter outputs a first ramp signal in response to the count, and further comprising:

a ramp generation circuit that generates a second ramp signal;

a comparison circuit that compares the first ramp signal to the second ramp signal, and outputs a ramp comparison signal; and a generator circuit that adjusts the phase of the third signal in response to the ramp comparison signal.

* * * * *

UNITED STATES PATENT AND TRADEMARK OFFICE
CERTIFICATE OF CORRECTION

PATENT NO. : 6,493,396 B1
DATED : December 10, 2002
INVENTOR(S) : Nguyen, Luu V.

It is certified that error appears in the above-identified patent and that said Letters Patent is hereby corrected as shown below:

Title page,
Item [75], Inventors, "Victor S. Ivashin, Rohnert Park, CA", delete the words "Rohnert Park" and insert -- Santa Rosa --.

Signed and Sealed this

Tenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,493,396 B1
DATED : December 10, 2002
INVENTOR(S) : Luu V. Nguyen and Victor S. Ivashin Page 1 of 1

It is certified that error appears in the above-identified patent and that said Letters Patent is hereby corrected as shown below:

Title page,
Item [73], Assignees, "Advanced Fibre Communications, Naperville, IL(US)", delete the words "Naperville, IL(US)" and insert -- Petaluma,CA(US) --

Signed and Sealed this

Ninth Day of August, 2005

JON W. DUDAS
*Director of the United States Patent and Trademark Office*